US009858573B2

(12) United States Patent
Tew et al.

(10) Patent No.: US 9,858,573 B2
(45) Date of Patent: *Jan. 2, 2018

(54) SIGNAL DETECTION AND BLOCKING FOR VOICE PROCESSING EQUIPMENT

(71) Applicant: Semafone Limited, Surrey (GB)

(72) Inventors: Andrew Peter William Tew, Bucks (GB); David Jackson, Surrey (GB); Timothy Critchley, Surrey (GB); Richard Charles Cooper-Driver, London (GB)

(73) Assignee: Semafone Limited, Surrey (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/299,699

(22) Filed: Jun. 9, 2014

(65) Prior Publication Data

US 2015/0127538 A1 May 7, 2015

Related U.S. Application Data

(63) Continuation of application No. 12/991,642, filed as application No. PCT/GB2009/001143 on May 8, 2009.

(30) Foreign Application Priority Data

| May 9, 2008 | (GB) | .................................. 0808448.5 |
| Sep. 30, 2008 | (GB) | .................................. 0817841.0 |

(51) Int. Cl.
*H04M 11/00* (2006.01)
*G06Q 20/40* (2012.01)
(Continued)

(52) U.S. Cl.
CPC ...... *G06Q 20/40145* (2013.01); *H04M 1/665* (2013.01); *H04M 3/38* (2013.01);
(Continued)

(58) Field of Classification Search
CPC ................. H04M 3/51; H04M 3/5183; H04M 2203/6009; H04M 3/42323; H04M 15/47; H04M 2215/0148; H04M 2203/6027
(Continued)

(56) References Cited

U.S. PATENT DOCUMENTS 5,016,270 A * 5/1991 Katz ...................... H04M 11/00
379/91.02
5,177,785 A 1/1993 Itani et al.
(Continued)

FOREIGN PATENT DOCUMENTS

EP 0568240 A1 11/1993
EP 0827318 A2 3/1998
(Continued)

OTHER PUBLICATIONS

"U.S. Appl. No. 12/991,642, Non Final Office Action dated Feb. 4, 2013", 7 pgs.
(Continued)

*Primary Examiner* — Stella Woo
(74) *Attorney, Agent, or Firm* — Schwegman Lundberg & Woessner, P.A.

(57) ABSTRACT

A telephone call processor for processing telephone calls comprising voice signals and data signals, the call processor comprising a first telephone interface and a second telephone interface, the call processor being operable in a first mode and in a second mode. In the first mode, the call processor is adapted to receive voice signals and data signals at the first telephone interface and to transmit voice signals and data signals via the second telephone interface. In the second mode, the call processor is adapted to receive voice signals and data signals at the first telephone interface, to block data signals from being transmitted via the second
(Continued)

telephone interface and optionally to transmit voice signals via the second telephone interface.

29 Claims, 16 Drawing Sheets

(51) Int. Cl.

| | |
|---|---|
| *H04M 3/38* | (2006.01) |
| *H04M 3/42* | (2006.01) |
| *H04M 1/665* | (2006.01) |
| *H04M 3/493* | (2006.01) |
| *H04M 3/51* | (2006.01) |
| *H04M 3/436* | (2006.01) |

(52) U.S. Cl.
CPC .............. *H04M 3/382* (2013.01); *H04M 3/42* (2013.01); *H04M 3/493* (2013.01); *H04M 3/5166* (2013.01); *H04M 3/5183* (2013.01); *H04M 3/436* (2013.01)

(58) Field of Classification Search
USPC ... 379/93.02, 93.12, 93.17, 91, 265, 266, 88
See application file for complete search history.

(56) References Cited

U.S. PATENT DOCUMENTS

| | | | |
|---|---|---|---|
| 5,327,492 A | 7/1994 | Parola | |
| 5,329,589 A * | 7/1994 | Fraser | G06Q 20/02 379/91.02 |
| 5,799,063 A * | 8/1998 | Krane | H04M 3/493 379/88.04 |
| 5,838,773 A | 11/1998 | Eisner et al. | |
| 5,867,562 A * | 2/1999 | Scherer | H04M 3/436 379/114.15 |
| 5,918,213 A | 6/1999 | Bernard et al. | |
| 5,991,372 A * | 11/1999 | Davenport D'Ingianni | G06Q 20/00 379/91.02 |
| 7,042,992 B1 | 5/2006 | Falcone et al. | |
| 7,142,658 B2 | 11/2006 | Sauvage et al. | |
| 8,204,180 B1 * | 6/2012 | Narayanan et al. | 379/88.04 |
| 8,275,115 B1 | 9/2012 | Everingham et al. | |
| 8,346,659 B1 * | 1/2013 | Mohsenzadeh | 705/39 |
| 8,750,471 B2 * | 6/2014 | Tew et al. | 379/93.12 |
| 2003/0097339 A1 | 5/2003 | Funck et al. | |
| 2004/0030607 A1 * | 2/2004 | Gibson | G06Q 20/04 705/75 |
| 2004/0193897 A1 | 9/2004 | Van Volkenburgh | |
| 2005/0086164 A1 * | 4/2005 | Kim et al. | 705/40 |
| 2006/0028488 A1 | 2/2006 | Gabay et al. | |
| 2006/0050658 A1 | 3/2006 | Shaffer et al. | |
| 2007/0269025 A1 * | 11/2007 | Shieh | 379/67.1 |
| 2008/0144787 A1 | 6/2008 | Gantman et al. | |
| 2010/0161990 A1 * | 6/2010 | Statham et al. | 713/172 |
| 2011/0228919 A1 | 9/2011 | Tew | |

FOREIGN PATENT DOCUMENTS

| | | |
|---|---|---|
| FR | 2 783 992 | 3/2000 |
| WO | WO-2007/122617 A2 | 11/2007 |
| WO | WO-2008/002276 A1 | 1/2008 |
| WO | WO-2008/073057 A1 | 6/2008 |
| WO | WO-2009/136163 A2 | 11/2009 |

OTHER PUBLICATIONS

"U.S. Appl. No. 12/991,642, Notice of Allowance dated Sep. 25, 2013", 8 pgs.
"U.S. Appl. No. 12/991,642, PTO Response to Rule 312 Communication dated May 19, 2014", 2 pgs.
"U.S. Appl. No. 12/991,642, Response filed Jul. 3, 2013 to Non Final Office Action dated Feb. 4, 2013", 17 pgs.
"International Application No. PCT/GB2009/001143, International Preliminary Report on Patentability dated Nov. 9, 2010", 10 pgs.
"International Application No. PCT/GB2009/001143, International Search Report and Written Opinion dated Jan. 25, 2010", (dated Jan. 25, 2010), 18 pgs.
"United Kingdom Application Serial No. GB1020894.0, Search and Examination Report dated Nov. 21, 2011", 9 pgs.
"United Kingdom Combined Search and Examination Report dated Dec. 18, 2008", (dated Dec. 18, 2008), 4 pgs.
"United Kingdom Combined Search and Examination Report dated Jul. 16, 2008", (dated Jul. 16, 2008), 6 pgs.
"U.S. Appl. No. 12/991,642, 312 Amendment filed May 13, 2014", 3 pgs.
"U.S. Appl. No. 12/991,642, Preliminary Amendment filed Nov. 8, 2010", 4 pgs.
"Expert Report of Concepta Gabrielle Penn on Behalf of the Claimant", Semafone, Claimant, and Eckoh PLC, Eckoh UK Limited and Whitbread Group PLC, Defendants, (Dec. 23, 2014), 56 pgs.
"Expert Report of Concepta Gabrielle Penn on Behalf of the Claimant", Semafone, Claimant, and Eckoh PLC, Eckoh UK Limited and Whitbread Group PLC, Defendants, (Feb. 6, 2015), 36 pgs.
"Further Reply Report of Concepta Gabrielle Penn on Behalf of the Claimant", Semafone, Claimant, and Eckoh PLC, Eckoh UK Limited and Whitbread Group PLC, Defendants, (Mar. 9, 2015), 5 pgs.
"LiveOps Annouces General Availability of Secure Exchange", [online]. Press Announcement. © 2012 LiveOps. [retrieved on Jun. 27, 2014]. Retrieved from the Internet: <URL: http://ip-208-90-202-81.liveops.com/company/pressroom/pr-011607.html>, (Jan. 16, 2007), 2 pgs.
"LiveOps: Tell the Rep Nothing", [online]. Press Announcement. [retrieved on Jan. 5, 2014]. Retrieved from the Internet: <URL: http://www.destinationcrm.com/Articles/PrintArticle.aspx?ArticleID=44765>, (Jan. 15, 2007), 1 pg.
"European Application Serial No. 09742359.4, European Examination Report dated Jan. 17, 2017", (dated Jan. 17, 2017), 5 pgs.

\* cited by examiner

"normal" mode

"safe" mode

SIGNAL DETECTION AND BLOCKING FOR VOICE PROCESSING EQUIPMENT

PRIORITY CLAIM TO RELATED APPLICATIONS

This application is a continuation of and claims the benefit of priority to U.S. patent application Ser. No. 12/991,642, entitled "SIGNAL DETECTION AND BLOCKING FOR VOICE PROCESSING EQUIPMENT," filed Nov. 8, 2010, which claims the benefit of priority to U.S. national stage application filed under 35 U.S.C. §371 from International Application Serial No. PCT/GB2009/001143, which was filed May 8, 2009, and published as WO 2009/136163 on Nov. 12, 2009, and which claims priority to United Kingdom Application No. 0808448.5, filed May 9, 2008, and claims priority to United Kingdom Application No. 0817841.0, filed Sep. 30, 2008, which applications and publication are incorporated by reference as if reproduced herein and made a part hereof in their entirety, and the benefit of priority of each of which is claimed herein.

The present invention relates to a telephone call processing system and method, and in particular to an apparatus to enable a caller to perform a transaction, facilitated by a call centre, with a third party without having to disclose sensitive information to the call centre.

In another aspect, the present invention also relates to a system for the secure communication of information and a method of operating the same. The system and method of the present invention find particular use in the communication of information, such as personal and/or financial information, between a user and a call centre or the like.

There is increasing interest in the use of call centres to provide services to the public. These are typically large installations of telephone operators or agents which provide organisations with a central facility for interacting with their clients, consumers or customers in a cost efficient way. Call centres have evolved from providing general information to providing highly personalised services tailored to the specific caller. Call centres are also being used to allow for payment by telephone for goods and services. These often require the involvement of a third party such as a bank or a retailer.

Increasing use is being made of telephone systems to conduct business and to make financial transactions. In particular, many organisations operate by the use of call switching centres, in which telephone calls are received and processed. There is a high and increasing level of use of such call centres by organisations to make financial transactions and to receive payments from users, callers and customers. In many cases, the completion of a financial transaction by telephone with a call switching centre requires the user or customer to provide one or more items of personal data or information. Examples of such data and information include alphanumeric passwords, personal information such as date of birth, postcode (zip code) and the like, and data relating to financial instruments, such as numbers of credit and debit cards, bank account numbers and the like.

As will be appreciated, the information required for authentication of the identity of the caller and for authorisation of transactions is of a sensitive nature. Where this information is provided by the caller in an insecure manner there is a risk that integrity of the information may be compromised and it may be used in criminal activity such as fraud and identity theft. Hence, given the nature of the communication between a user or customer and a call switching centre and, in particular, the nature of the information being provided in many cases by the user or customer to the operator in the call switching centre, security is a key issue.

In some scenarios, this sensitive information is passed verbally from the caller to an agent at the call centre. In other scenarios, the caller transmits this information by making use of the touch-tone facility of a suitable telephone handset. This allows for the transmission of DTMF (dial-tone multifrequency) audio signals, wherein each audio signal is understood to represent an alphanumeric symbol.

Both of these scenarios implicitly assume that the call centre agent is trustworthy. The onus is on the call centre staff to exercise due care in handling the information in a secure manner. However, the possibility exists that this trust is misplaced and that sensitive information may be recorded. Elaborate and sometimes draconian schemes are therefore commonly used to attempt to prevent this, such as forbidding call centre employees to bring any form of recording equipment to their place of work.

Having the user or customer provide the aforementioned information verbally is a particularly insecure means of communicating such information, as the extent to which the transaction is secure depends in large part upon the operator and other staff in the call switching centre handling the data and information provided in a secure way.

Unfortunately, it is the case that call switching centres have been responsible for breaches in the personal security of users and customers, in turn resulting in instances of financial fraud and identity theft. The relatively high turnover of staff in many call switching centres increases the practical problems of ensuring that each staff member operates according to and adheres to the strict security practices required.

As an alternative to requiring the user or customer to provide the necessary personal and/or financial data and information verbally over the telephone, it is known to have the system operate by having the user enter the required information in an alphanumeric form using the keypad of the telephone. In the vast majority of cases, such a system will rely on dual-tone multi frequency tone (DTMF) signalling.

However, it has been known for DTMF signals received at a call switching centre to be recorded by a staff member, for later criminal use. Where this is possible, the use by the user of a telephone keypad to provide the data and information in a form such as DTMF does not completely overcome the problems of providing a secure communication system. In particular, the DTMF signal can be decoded by the recipient and the alphanumeric data identified.

In addition, and possibly of greater concern, the DTMF data are stored in call recording files generated by the call centre or the like when calls are recorded. Such files can be stolen and the stored data identified. The theft of such files represents a major security risk and is of considerable concern to financial institutions and other users of the systems.

Accordingly, there is a need for an improved system and method for allowing secure communication across a telephone system, in particular to allow for personal and/or financial data and information to be provided in a secure manner.

According to one aspect of the invention, there is provided a telephone call processor for processing telephone calls comprising voice signals and data signals, the call processor comprising a first telephone interface and a second telephone interface, the call processor being operable in a first mode and in a second mode, wherein:

in the first mode, the call processor is adapted to receive voice signals and data signals at the first, optionally telephone, interface and to transmit voice signals and data signals to the second, optionally telephone, interface; and in the second mode, the call processor is adapted to receive voice signals and data signals at the first, optionally telephone, interface, to block data signals from being transmitted to the second, optionally telephone interface and optionally to transmit voice signals to the second, optionally telephone interface.

Hence a telephone call processor with such a capability can be switched between a first "normal" mode, wherein it is essentially transparent to the entities connected via the first and second telephone interfaces, and a second "safe" mode, wherein potentially sensitive data sent by the first entity connected via the first, optionally telephone, interface is prevented from reaching the second entity connected via the second, optionally telephone, interface, whilst voice communication between the two entities remains unaffected. This can afford the advantage that the first entity may have a transaction facilitated by the second entity without having to disclose sensitive data to the second entity and whilst continuing a voice conversation with the second entity. This can provide security for the first entity combined with voice feedback to both entities, without exposing sensitive data to risk of compromise at the call centre.

Preferably, the data signals comprise audio tones. More preferably, the data signals comprise DTMF (dial-tone multi-frequency) audio tones.

Use of audio tones such as DTMF alleviates the need for separate telephone lines for voice and data. Furthermore, DTMF tone signalling is a readily available and known system used in the art for allowing data input via standard telephone handsets, thereby allowing the call processor to be easily integrated into existing telephone systems.

Preferably, the call processor is adapted to switch between first and second modes in response to receiving a mode-switching data signal at the first or at the second, optionally telephone, interface. The mode-switching data signal may be an audio tone such as a DTMF tone. The mode-switching data signal may be representative of an alphanumeric sequence.

Alternatively, the mode-switching data signal may be a CTI (Computer Telephony Integration) signal. Alternatively, the mode-switching data signal may be implied from the context of preceding data signals received by the call processor.

Thus the processor may be adapted to switch between the first and second modes in response to receiving one of a plurality of different mode-switching data signals. The advantage of having a plurality of ways of activating the switch of the call processor to the second "safe" mode is to allow easier integration of the call processor into existing systems.

Preferably, the call processor is further adapted, when in the second mode, to transmit to the second, optionally telephone, interface, in response to a data signal received at the first or second interface, a masked data signal unrelated to that received at the first or second, optionally telephone, interface.

This is referred to as a "masked" signal in that it is not possible to infer the original signal from it, the advantage being in that feedback is thereby provided to the second entity as to the fact of data being received from the first entity without making the second entity privy to the content of the data received.

Preferably, the number of masked signals transmitted to the second, optionally telephone, interface is related to the number of data signals received at the first, optionally telephone, interface. Preferably, the masked signals transmitted to the second, optionally telephone, interface comprise tones of a single pitch, or alternatively tones of random pitch.

Preferably, the telephone call processor further comprises a third, optionally data, interface, and is further adapted when in the second mode to transmit data signals to the third, optionally data, interface in dependence on data signals received at the first and/or second, optionally telephone, interfaces.

Preferably, the first, optionally telephone, interface is adapted to receive and transmit telephone calls comprising voice and data signals to and from a client or consumer; the second, optionally telephone, interface is adapted to receive and transmit telephone calls comprising voice and data signals to and from a call centre; and the third, optionally data, interface is adapted to receive and transmit data signals to and from an entity with which the client or consumer wishes to undertake a transaction, for example, a merchant or credit card authority.

In an alternative, the third, optionally data, interface is further adapted to receive and transmit data signals to and from a verifying entity for authenticating and/or authenticating the identity of the client or consumer.

The call processor may be operable in further mode, wherein in the further mode the call processor is preferably adapted: to receive signals (e.g. data signals) associated with stored information at the first telephone interface, to retrieve the stored information in response to receipt of the signals, and to transmit the retrieved information to the first telephone interface. In the further mode, the signals received at the first interface may be blocked from being transmitted to the second telephone interface.

The call processor may be adapted: to extract information from voice signals received at the first interface for use in verification; and preferably to verify the origin of the voice signals for use in verification based on the extracted information; wherein the voice signals for use in verification are preferably blocked from transmission via the second telephone interface.

The call processor may be adapted: to process voice and/or data signals received at the first and/or second interface to determine a response; preferably to generate voice signals representing the determined response; and preferably to transmit the generated voice signals to the first and/or second interface.

The call processor may comprise a telephony module (e.g. a telephony card) and preferably a processing module wherein: the telephony module may comprise the first and second telephone interfaces for receipt and transmission of the voice signals and the data signals; the processing module may be operable in a first control mode in which the processing module is adapted to control the receipt and transmission of voice and data signals by the telephony module; and the processing module may be operable in a second control mode in which the processing module may be adapted to control receipt and transmission of voice and data signals by a further telephony module of a further call processor.

The call processor may further comprise a data interface, the call processor preferably being adapted: to receive signals representing sensitive information at the first telephone interface; preferably to process the received signals representing the sensitive information to generate data representing the sensitive information; and preferably to transmit the generated data via the data interface.

The call processor may be adapted: to receive signals at the first and/or second telephone interface from a first entity and to selectively transmit the signals to a second entity via the other of the first and second telephone interfaces; preferably to selectively block the signals received at the first and/or second telephone interface from transmission via the second entity via the other of the first and second telephone interfaces; and preferably to control an interaction with a third entity in dependence on the received signals.

The call processor may be adapted: to receive signals at the first telephone interface representing information relating to a transaction, preferably wherein the signals representing information relating to the transaction are blocked from transmission via the second interface; preferably to generate a verification request based on the transaction information; preferably to transmit the verification request to a verification entity; and preferably to receive a message from the verification entity to identify verification success or failure.

The call processor may comprise a telephony module (e.g. a telephony card) and preferably a processing module wherein: the telephony module preferably comprises the first and second telephone interfaces for receipt and transmission of the voice signals and the data signals, and preferably an interface for communication with the processing module; and wherein the processing module may be adapted to control, via the interface for communication with the processing module, the receipt and transmission of voice and data signals by the telephony module such that: data signals received at the first interface are selectively blocked from being transmitted to the second telephone interface.

According to another aspect of the invention, there is provided a method of processing telephone calls comprising voice signals and data signals, the method comprising:

in a first mode, receiving voice signals and data signals at a first, optionally telephone, interface and transmitting voice signals and data signals to a second, optionally telephone, interface; and in a second mode, receiving voice signals and data signals at a first, optionally telephone, interface, transmitting voice signals to a second, optionally telephone, interface and blocking data signals from being transmitted to a second, optionally telephone, interface.

Some further aspects of the invention will now be described.

Further Secure Mode

In a further aspect of the invention there is provided a telephone call processor for allowing secure information retrieval during a telephone call, the call processor comprising a first telephone interface and a second telephone interface, the call processor being adapted: to receive signals at the first telephone interface and to selectively transmit the signals received at the first telephone interface to the second telephone interface; to receive signals, at the first telephone interface, associated with stored information wherein the signals associated with the stored information are blocked from transmission via the second telephone interface; to retrieve the stored information in response to receipt of the signals; and to transmit the retrieved information to the first telephone interface.

The signals associated with the stored information may represent security information (e.g. a password, passphrase, PIN or the like). The call processor may be adapted to verify the security information. The retrieval and transmission of the stored information may be conditional on successful verification.

The signals associated with the stored information may be data signals (e.g. DTMF (dial-tone multi-frequency) audio tones).

The stored information may comprise authentication information (e.g. a voice message and/or secret text pre-recorded or pre-stored by a caller/call recipient) for authenticating an originator (or recipient) of a call via the via the call processor.

The call processor may be adapted: to receive signals at the second telephone interface, associated with the stored information. The retrieval of the stored information may be dependent both on the signals associated with the stored information received at the first interface and the signals associated with the stored information received at the second interface.

The signals associated with the stored information received at the second interface may represent information identifying (e.g. a caller ID, originator ID, agent ID, recipient ID, merchant ID or the like) an originator (or recipient) of a call via the call processor.

Voice/Biometric Verification

In a further aspect of the invention there is provided a telephone call processor for processing telephone calls, the call processor comprising a first telephone interface and a second telephone interface, the call processor being adapted: to receive signals at the first telephone interface and to selectively transmit the signals received at the first telephone interface to the second telephone interface; to receive, at the first telephone interface, voice signals for use in verification wherein the voice signals for use in verification are blocked from transmission via the second telephone interface; to extract information from the voice signals for use in verification; and to verify the origin of the voice signals for use in verification based on the extracted information.

The extracted information may comprise biometric information (e.g. the intonation of speech represented by the voice signals). The extraction of information for use in verification may comprise analysing the voice signals to determine a meaning of a spoken word or phrase. The extracted information may represent the meaning. The voice signals for use in verification may represent spoken security information (e.g. a password, passphrase, credit card details or the like).

Voice Feedback Generation

In a further aspect of the invention there is provided a telephone call processor for processing telephone calls, the call processor comprising a first telephone interface and a second telephone interface, the call processor being adapted: to receive signals at the first and second telephone interfaces and to selectively transmit the signals received at the first and second telephone interfaces to the other of the first and second telephone interfaces; to block transmission of at least some data signals received at the first interface to the second interface whilst simultaneously allowing transmission of at least some voice signals received at the first interface to the second interface; to process the signals received at the first and/or second interface to determine a response; to generate voice signals representing the determined response; and to transmit the generated voice signals to the first and/or second interface.

Resilience

In a further aspect of the invention there is provided a telephone call processor for processing telephone calls, the call processor comprising at least one telephony module (e.g. a telephony card) and a processing module wherein: the telephony module comprises first and second telephone interfaces for receipt and transmission of signals; the processing module is operable in a first control mode in which the processing module is adapted to control the receipt and transmission the signals by the telephony module; and wherein the processing module is operable in a second control mode in which the processing module is adapted to control receipt and transmission of signals by a further telephony module of a further call processor.

When operating in the second control mode the processing module may be adapted to control the receipt and transmission of voice and data signals by both the telephony module and the further telephony module. The and/or the further call processor may comprise a plurality of telephony modules. The processing module may be adapted to control any of the telephony modules in dependence on the control mode.

When operating in the second control mode the processing module may be adapted to control receipt and transmission of voice and data signals by a telephony module of any of a plurality of further call processors.

System Integration

In a further aspect of the invention there is provided a telephone call processor for handling sensitive information during a telephone call, the call processor comprising a first telephone interface, a second telephone interface, and a data interface, the call processor being adapted: to receive signals at the first telephone interface and to selectively transmit the signals received at the first telephone interface to the second telephone interface wherein the received signals include signals representing sensitive information, and wherein the signals representing sensitive information are blocked from transmission via the second interface; to process the received signals representing the sensitive information to generate data representing the sensitive information; and to transmit the generated data via the data interface.

The data interface may be a secure interface (e.g. comprising a secure socket layer SSL socket) for communication of data in an encrypted form. The data may be encrypted such that the encrypted data is only capable of decryption by a certified computer device. The data may be encrypted such that the encrypted data is only capable of decryption by a certified computer device on which a specific certificate (e.g. an SSL certificate) is installed. The certificate may be generated by a source other than a standard certification authority.

The data interface may be an interface for communication of data to a web page. The transmission of the generated data via the data interface may comprise transmission to a computer device.

Controlling Interaction with a Third Party

In a further aspect of the invention there is provided a telephone call processor for controlling interaction with an entity, the call processor comprising a first telephone interface and a second telephone interface, the call processor being adapted: to receive signals at the first and/or second telephone interface from a first entity and to selectively transmit the signals to a second entity via the other of the first and second telephone interfaces; to selectively block the signals received at the first and/or second telephone interface from transmission via the second entity via the other of the first and second telephone interfaces; and to control an interaction with a third entity in dependence on the received signals.

The call processor may control the interaction by generating further signals, in dependence on the received signals, the generated signals may be operable to control an activity of the third entity. The third entity may comprise equipment. The generated signals may represent at least one instruction (e.g. messages, commands) for controlling the equipment. The equipment may comprise recording equipment for recording the signals received at the first and/or second telephone interface. The equipment may comprise equipment for allowing or inhibiting access to an area (e.g. a secure area). The third entity may comprise a communication network. The generated signals may represent at least one message for communication via the communication network. The at least one instruction may comprise an instruction to send the message. The call processor may be adapted to control the interaction by controlling the secure communication of information between the first and third entities preferably in dependence on the received signals.

Hosted Payment Gateway

In a further aspect of the invention there is provided a telephone call processor for processing telephone calls, the call processor comprising a first telephone interface and a second telephone interface, the call processor being adapted: to receive signals at the first telephone interface and to selectively transmit the signals received at the first telephone interface to the second telephone interface wherein the received signals include signals representing information relating to a transaction, and wherein the signals representing information relating to the transaction are blocked from transmission via the second interface; to generate a verification request based on the transaction information; to transmit the verification request to a verification entity; and to receive a message from the verification entity to identify verification success or failure.

The signals representing information relating to the transaction may represent purchaser information (e.g. credit card details, bank account details or the like). The call processor may be adapted to receive signals at the second interface which may represent further information relating to the transaction and may be adapted to generate the verification request based on the further transaction information. The signals representing further information relating to the transaction may represent vendor information (e.g. order/purchase/call reference number, merchant ID, required payment value or the like). The call processor may be adapted to generate signals representing a verification message based on the message received from the verification entity, and may be adapted to transmit the verification message to the second and/or first interface accordingly. The signals representing the verification message may comprise voice (or data) signals.

Modularisation

In a further aspect of the invention there is provided a telephone call processor for processing telephone calls comprising voice signals and data signals, the call processor comprising a telephony module (e.g. a telephony card) and a processing module wherein: the telephony module comprises first and second telephone interfaces for receipt and transmission of the voice signals and the data signals, and an interface (e.g. an internet protocol (IP) interface) for communication with the processing module; and wherein the processing module is adapted to control, via the interface for communication with the processing module, the receipt and transmission of voice and data signals by the telephony module such that: data signals received at the first interface are selectively blocked from being transmitted to the second telephone interface.

The processing module may be adapted to control a plurality of the telephony modules. The processing module may be a first processing module and may be adapted to extract information from the voice and/or data signals. The call processor may comprise a second processing module adapted to process the information extracted by the first processing module. The first processing module may be operable to communicate the extracted information over an interface (e.g. an internet protocol (IP) interface) preferably between the first and second processing modules. The first and second processing modules may be configured for location remotely from one another. The (or the first) processing module may be configured for location remotely from the or each telephony module. The (or at least two of the) modules are connected via a network.

Other Aspects

In another aspect, the present invention provides a system for the transmission of data for a telephone transaction between a user and a switch, the system comprising:

means for receiving a telephone communication from the user, the telephone communication comprising verbal information from the user and transactional information comprising information required for the transaction and being for secure transmission, the transactional information being in a different format to the verbal information and ordinarily being readable by the switch;

means for establishing a telephone connection with the switch, allowing verbal communication between the user and the switch; and means for processing the telephone communication from the user such that that the transactional information is withheld from direct transmission to the switch, while still maintaining the availability of verbal communication between the user and the switch.

Preferably, the transaction is a financial transaction.

Preferably, the transactional information data signal is received as a multi-frequency signal. The multi-frequency signal may be a DTMF signal. The transactional information receivable by the system may be input by the user using the keypad of the user's telephone apparatus.

Preferably, the system further comprises means for receiving a data signal from the switch in a different format to the verbal information. The data signal may be a CTI or a DTMF signal generated at the switch.

Preferably, the means for processing is responsive to the said data signal.

Preferably, the ability of the system to receive the transactional information data signal from the user is controllable by the said information received from the switch.

Preferably, the means for processing is configured to generate a signal for transmission to the switch. The signal for transmission to the switch may indicate features of the transactional information received from the user.

Preferably, the transactional information is an alphanumeric sequence and signal indicates the number of digits in the sequence received by the system from the user.

Preferably, the system further comprises a memory. The means for processing may be configured to store the transactional information received from the user in the memory.

Preferably, the means for processing is configured to generate data identifying the call made by the user. The identifying data may be transmitted to the switch.

Preferably, the means for processing converts the transactional information into a format that is not ordinarily readable by an operator at the switch, but may be processed by the switch to complete the transaction.

Preferably, the system further comprises means for transmitting the transactional information data signal to a third party. The transmitting means may be controllable by data signals received from the switch.

In a further aspect, the present invention provides a method for transmitting data relating to a transaction to be completed over a telephone network between a user and a switch, the method comprising:

receiving a telephone communication from the user, the telephone communication comprising verbal information from the user and transactional information comprising information required for the transaction and being for secure transmission, the transactional information being in a different format to the verbal information and ordinarily being readable by the switch;

establishing a telephone connection with the switch, allowing verbal communication between the user and the switch; and processing the telephone communication from the user such that that the transactional information is withheld from direct transmission to the switch, while still maintaining the availability of verbal communication between the user and the switch.

Preferably, the transactional information data signal is a multi-frequency signal. The multi-frequency signal may be a DTMF signal.

Preferably, the method further comprises generating data identifying the call. The identifying data may be transmitted to the switch.

Preferably, the method further comprises generating a data signal relating to features of the transactional information, the data signal being unrelated to the values of the transactional information. The data signal may indicate the number of digits of the transactional information. The data signal may be transmitted to the switch.

Preferably, the format of the transactional information data signal is converted to a format that is not ordinarily readable or translatable be an agent or operator at the switch and/or is not recordable.

Preferably, the converted data signal is transmitted to the switch.

Preferably, the method comprises generating control signals from the switch, the control signals being used to activate the receiving and processing of the transactional information data signals.

Preferably, the method further comprises transmitting transactional information data signals to a third party. The data signals so transmitted may be the same as the signals received from the user. Alternatively, the data signals may be in a format different to the format of the data signals received from the user.

Preferably, the transaction is a financial transaction.

In a further aspect, the present invention provides a telephone network comprising:

a user station to enable a user to make a telephone call;

a switch; and a system as herein described.

Preferably, the user station comprises a telephone and a system as herein described.

Preferably, the system for the transmission of data for a telephone transaction is substantially as hereinbefore described having reference to the accompanying figures.

Preferably, the method for the transmission of data for a telephone transaction is substantially as hereinbefore described.

Preferably, the telephone network is substantially as hereinbefore described having reference to the accompanying figures.

The system and method of the present invention allow a user to conduct a transaction with a call centre involving the transmission of sensitive data, such as personal information, financial information and the like, with a significantly increased level of security. In particular, the system and method allowing the transaction to proceed and the necessary sensitive data to be transmitted without interrupting the verbal communication between the user and the agent or operator at the call centre. In the past, such transactions have involved the user providing the sensitive information either verbally or by entering the information in an alphanumeric format using the telephone keypad. In either case, the information is disclosed directly to the agent or operator at the call centre either directly or in a readable format, and the level of security of the disclosure is limited by the extent to which the operations within the call centre are secure. In addition, transaction data are stored in the cases that the calls from users are recorded by the call centre, as is very often the case. The security of the disclosed information is therefore limited to the level of security of the recording files within the call centre. The system and method of the present invention overcome these limitations and avoid possible breaches of security of the sensitive information.

The system and method of the present invention relate to the communication between a user and a switch using a telephone system or network. In the present specification, the term 'switch' is used to refer to any device or installation that may be called by a user to make a transaction over the telephone and includes any facility, such as a call centre or other institution where an agent or operator is active to collect information from the user that is sensitive and requiring secure transmission and handling. Such information includes, but is not limited to, personal information, such as address data, including a postal code or zip code, date of birth, national insurance number, social security number and the like, and financial information, such as credit card numbers, charge card numbers, bank account numbers and sort codes, and associated information, such as passwords and answers to security questions that may be established to enable identification of the user by the agent at the switch.

The user and the switch are typically in different locations, in most cases a great distance apart. Increasingly, it is the practice of companies and organisations that handle transactions with users or customers by telephone to use call centres located in countries different to the country of location of the user and/or the company or organisation itself. It is an advantage of the system of the present invention that it can be installed in an existing telephone network or system, such that telephone calls originally routed directly from the user to the switch are first routed to the system. Thus, when the user makes a call to the switch with the intention of carrying out a telephonic transaction, the call is received by the system of the present invention and routed to the switch such that a telephone connection is made between the user and the switch.

In a preferred arrangement, all the calls made by users to a given switch are routed through the system of the present invention, to ensure that the system can effectively capture and process any sensitive information disclosed by the user.

An advantage of the system of the present invention is that it may be sited at any convenient location, which may be distanced from one or both of the user and switch. It will thus be appreciated that the user, the system of the present invention and the switch may be in the same country, may be distributed in two countries or may each be located in a different country.

In one embodiment of the present invention, the system of the present invention is installed at the switch, such that the incoming call from the user is received and routed first through the system before the call is received by the agent or operator at the switch. In this embodiment, the system functions as a filter, allowing the agent or operator to conduct the transaction with the user, but preventing the agent or operator from having direct access to a readable form of the secure information transmitted by the user during the transaction.

In an alternative embodiment, the system of the present invention is at the location of the user, for example in a dedicated facility to be used by the user when wishing to make a secure transaction over the telephone with the switch.

In a further alternative, the system of the present invention is situated at a location remote from both the user and the switch, with calls from the user to the switch being routed automatically to the system and relayed by the system to the switch. Such automatic call routing is known in the art and may be employed on known and existing telephone networks and systems.

As noted above, the system and method of the present invention may be employed when making any transaction by telephone in which secure information is required to be transmitted by the user. As also noted, the system and method are particularly advantageous when used to make financial transactions, where the risks of fraud and theft are particularly high and the instances of such crimes are increasing.

In the present invention, the user makes a telephone call to the switch and engages in a telephone conversation with an agent or operator at the switch in the conventional manner. The system of the present invention operates to transmit all such verbal communications between the user and the switch without change or interference. The system thus has means for receiving a call from the user. In the case that the system is in a location remote from the user, the call from the user will typically be routed through a conventional telephone exchange and arrive at the system in a manner consistent with the telephone network into which the system is installed. Further, when the system is in a location remote from the switch, the system comprises means for establishing a connection with the switch. Again, such means may route the call in known manner, for example through a further part of the network through an exchange. The system may be arranged to receive calls from users and dispatch calls to one or more switches using any suitable means. Such means are known in the art and include conventional land line systems and networks, as well as wireless telephone systems and communications networks, again which are known in the art.

To be effective in increasing the security of sensitive information, the transaction being conducted should not be entirely verbal, that is involving the user verbally providing secure information, such as alphanumeric data, for example credit card numbers, account details, passwords and the like. Rather, the system and method require the user to provide such information, referred to herein as 'transactional information', in an alternative format to the verbal communication. The alternative format for the transactional information may be any suitable format that can be distinguished from the verbal information by the system processor and processed to prevent direct transmission in a readable form to the agent or operator at the switch. Preferably, the user is required to transmit transactional information as a multi-frequency signal. Such multi-frequency signal formats are known in the art and are widely used in existing telephone networks. A particularly common format is dual-tone multi-frequency (DTMF) signalling. It is an advantage of the system and method of the present invention that they can be readily applied to the known and currently used signalling formats, in particular DTMF signals.

The system and method of the present invention are applied to transactional information that is in a format that is ordinarily readable by an agent or operator at the switch. In this respect, 'readable' is to be understood to mean that the signal format is one that may be directly understood and comprehended by the agent or operator upon hearing or may be readily interpreted or decoded. For example, DTMF signals are used for transmitting alphanumeric data and are generated by the user by entering the required digits using the telephone keypad. The DTMF signals thus generated are generally audible to the agent or operator at the switch and may be translated using simple recording and/or decoding devices, thus allowing the transactional information to be procured for fraudulent or other illegal activities. In addition, as noted hereinbefore, it is common practice to record calls made by users and the recording process will include a recording of the audible DTMF signals, which are stored in a file in a suitable storage system. The collection of such stored files renders them a prime target for theft, as a route to obtaining personal, sensitive information relating to users and callers.

In the present invention, a processor is provided in the system. The processor may of any suitable form to process call signal data and suitable processors, in particular digital signal processors are well known in the art. The processor is employed to process the call signal data received from the user, in particular the transactional information, such that it is in a form that is not ordinarily readable by the agent or operator at the switch, but may still be processed in order to complete the transaction. The processing applied to the transactional information, in particular DTMF data, may be any required form. For example, the processing is at its simplest to identify that the telephone communication from the user contains transactional information, identify the transactional information and block its transmission to the switch. The thus blocked transactional data may be handled in a variety of ways, as described hereinafter.

Alternatively, the processor may convert the format of the transactional information signal to one that may be processed by the switch or other recipient, but that is not ordinarily readable by an agent or operator at the switch or the other recipient. For example, the processor may convert an audible signal of the transactional information, such as a DTMF signal, into a data signal that is inaudible to the agent or operator at the switch and cannot be recorded by conventional means used to record telephone calls and transactions. Alternatively, the processor may alter or otherwise mask the audible tones, such that they are rendered meaningless to the agent or operator and cannot be used to generate the transactional information originally input by the user.

In general, the transactional information signal is processed to render the actual transactional information unreadable and undeterminable by the agent or operator or to anyone accessing a recording of the call.

The processor may be arranged to generate an audible tone or other signal from the received transactional information signal, which generated signal is transmitted to the switch, merely to indicate to the agent or operator information regarding the data entry by the user, for example the position of the user in terms of their data entry, the number of digits, or other information regarding the nature or format of the entered data, but without providing any information regarding the transactional information itself.

In one arrangement, the processor is configured to generate a set of data indicating the identity of the call. Such a procedure is known in the art and is commonly applied in known telephone systems and networks. For example, the processor may generate a uniform resource name (URN) in known manner and of known format for each call received from a user. The call identity data may be transmitted and/or stored along with the other data received and/or generated during the call and the transaction.

Alternatively, or in addition, the agent or operator at the switch may be allowed to key in identifying data, such as a URN (for example as may be indicated on their computer screen or display) and such identifying data transmitted to the system of the present invention. Such switch-generated identifying data may, for example, be for the purpose of consolidating the information gathered during the verbal communication between the user and the agent or operator at the switch with the transactional information signal data provided by non-verbal means.

In one embodiment, the system further comprises a means for storing data. The storage means may be any suitable storage device or medium. Such storage means are well known in the art. Data stored on the storage means by the system may include data generated by the processor, data received from the user, for example the raw transactional information in signal data form or other data provided by the user during the transaction, or data received from the agent or operator or generated elsewhere within the system.

As described hereinbefore, the processor of the system acts to monitor the signal data received by the system from the user and to identify any transactional information input by the user during the call. In one embodiment, the processor acts as a filter, identifying the transactional information and preventing it from being transmitted directly to the switch. The transactional information may than be stored by the processor on the storage means, for example with other data relating to the call, such as URN and/or data received from the switch. The package of data relating to the call and the transaction may then be retrieved at a later time for further processing in a secure manner to complete the transaction.

In one preferred embodiment, the processor identifies the transactional information received by the system from the user and converts this transactional information into a format that is not readily readable by the agent or operator at the switch, thereby ensuring the security of the transactional information and preventing it from being easily copied and used inappropriately. The format of the converted transactional information is one that may be processed by an appropriate device at the switch, such as a processor. The system then transmits the converted transactional information to the switch, preferably accompanied by call identifying data, such as a URN, where the transactional information is processed by the switch, but without being directly accessible by or readable by the agent or operator. A copy of the data transmitted to the switch may also be stored in the storage means local to the system, if desired.

In an alternative, preferred arrangement, the system identifies and removes the transactional information from the call signal data received from the user and prevents its transmission to the switch, as described hereinbefore. The transactional information is then transmitted to a third party for further processing. The third party may be any third party or third party installation that is required to complete the transaction being conducted by the user. For example, in the case of a financial transaction, the third party installation may that of a credit card company or bank, where credit card information and the like are processed, for example to complete payment for goods or services. The processor may operate to filter out or remove the transactional information signal data from the call and reroute this data, in an unconverted form to the third party installation. For example, audible data signals, such as DTMF signal data, may be removed from the call data transmitted by the system to the switch, but simply redirected to the third party. In this way, a third party installation adapted to process conventional audible data signals, such as DTMF, may process the data to complete the transaction in the usual manner, without modification. Alternatively, the processor may both remove the transactional information signal data and convert it to a different format, prior to transmission to the third party installation. In such a case, the third party installation must be adapted to process the data received in the different format. Call data transmitted to the third party are preferably accompanied by call identifying data, such as a URN. Again, a copy of all data received, generated and/or transmitted may be stored by the processor on the local data storage device of the system.

The system of the present invention may be arranged to receive signal data from the switch, in addition to the verbal call signal data. In particular, the system may be arranged to receive control signal data from the switch, such that the operation of the system, for example the processor, may be controlled by the switch. The control signal data from the switch may be in any suitable format, for example ActiveX signals widely known and used in many existing systems and networks. The control data may be generated by the agent or operator at the switch, as required to progress or complete the transaction. In one embodiment, the processor only begins to process transactional information signal data once activated by receipt of a suitable activation command from the agent at the switch. For example, the agent or operator may first check with the user that the user is able to input certain required data, for example by way of the telephone keypad to generate DTMF signal data. Once this has been confirmed by the user, the agent or operator may then issue a control command to the system to initiate the receipt and processing of the DTMF signal data. Further, transmission of transactional signal data to a third party by the processor may also be under the control of the agent or operator at the switch, allowing the third party installation to be contacted and its processing initiated only when the transactional information is complete.

In a further preferred embodiment, the system is also configured to generate information data signals relating to the transactional information received from the user and to transmit such signals to the switch. The information data signals may contain information relating to the user input data, without providing the data itself to the switch in a form readily identifiable or readable to the agent or operator. This is particular useful, to allow the agent or operator to follow the progress of the data input by the user and to ensure that the correct or sufficient data have been provided. For example, the system may transmit to the switch an audible signal each time a key on the keypad is pressed by the user, indicating that a DTMF signal has been generated. In such a case, the audible signal generated by the system will be different to and unrelated to the audible DTMF signal. For example, a single audible tone may be generated each time a key is pressed, regardless of the key. In this way, the agent or operator is advised of how many digits are input by the user, which may then be compared with the known format of information expected. In addition, or alternatively, the system may generate a data signal that appears on the display screen of the agent or operator at the switch, such as a repeated symbol or character, again unrelated to the actual alphanumeric data being input by the user.

As noted above, the system of the present invention may be a stand-alone installation isolated from the user and the switch. The user, system and switch will thus be linked by a suitable telephone network.

Accordingly, in a further aspect, the present invention provides a telephone network comprising:
  a user station to enable a user to make a telephone call;
  a switch; and
  a system as hereinbefore described.

As described above, the system may be arranged to transmit converted signal data to the switch and/or receive control signal data from the switch. In such cases, the switch will be adapted to receive and process converted data generated by the system and/or generate and dispatch control commands to the system.

The system may be configured so as to process a plurality of simultaneous calls between a plurality of different users and a plurality of different switches. The system may also be configured to connect to a plurality of third party installations, as required.

Alternatively, the system of the present invention may be located at and form a component part of the switch installation, such that incoming calls from users are routed first through the system. Calls are processed by the system as an interface between the user and the switch as hereinbefore described.

As a further alternative, the system of the present invention may be located at and form a component part of a user station at which the user may make a secure transaction with a switch. All telephone calls made by users at the user station are thus routed first through the system and processed as described hereinbefore.

The invention also provides a computer program and a computer program product comprising software code adapted, when executed on a data processing apparatus, to perform any of the methods described herein, including any or all of their component steps.

The invention also provides a computer program and a computer program product comprising software code which, when executed on a data processing apparatus, comprises any of the apparatus features described herein.

The invention also provides a computer program and a computer program product having an operating system which supports a computer program for carrying out any of the methods described herein and/or for embodying any of the apparatus features described herein.

The invention also provides a computer readable medium having stored thereon the computer program as aforesaid.

The invention also provides a signal carrying the computer program as aforesaid, and a method of transmitting such a signal.

The invention also provides means plus appropriate function for carrying out the relevant functionality.

The invention also provides the appropriate devices, components or modules for carrying out the relevant functionality (as a skilled person would readily understand) including (by way of example only): a transmitter, transceiver, or transmission module for transmitting; a receiver, transceiver, or receiver module for receiving; a processor or processor/processing module for processing, generating signals, analysing, extracting, verifying, comparing, controlling, or other such functionality; and/or a controller or control module for controlling.

The invention extends to methods and/or apparatus substantially as herein described with reference to the accompanying drawings.

Any feature in one aspect of the invention may be applied to other aspects of the invention, in any appropriate combination. In particular, method aspects may be applied to apparatus aspects, and vice versa.

Furthermore, features implemented in hardware may be implemented in software, and vice versa. Any reference to software and hardware features herein should be construed accordingly.

The invention will now be described, purely by way of example, with reference to the accompanying drawings, in which.

Figure 2:
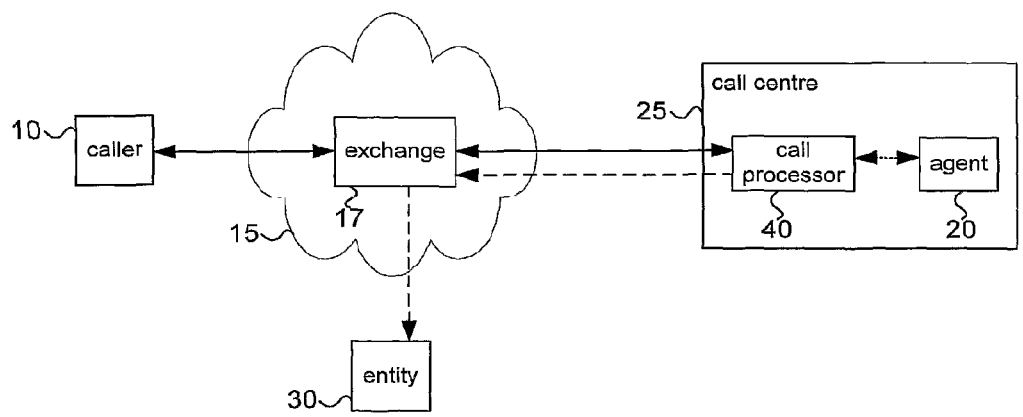
FIG. 2 shows a telephone call processing system by which a telephone caller communicates with a call centre according to an embodiment of the invention.
Figure 14A:
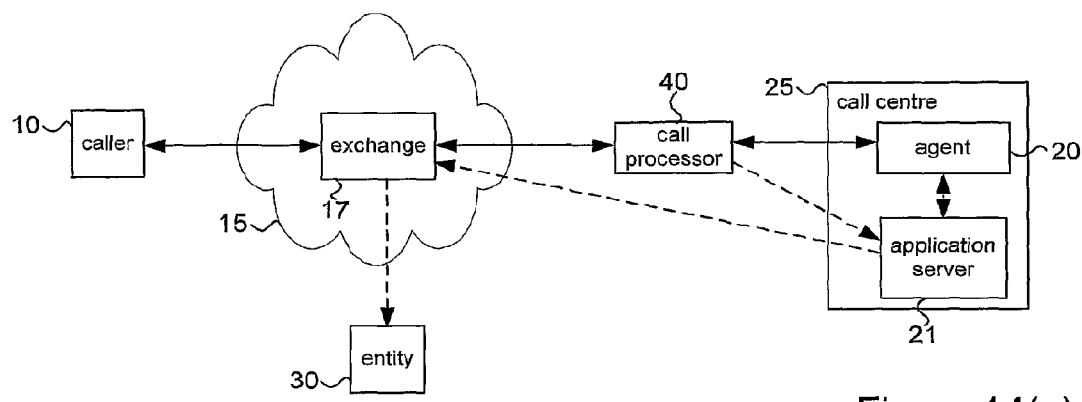
Figure 14B:
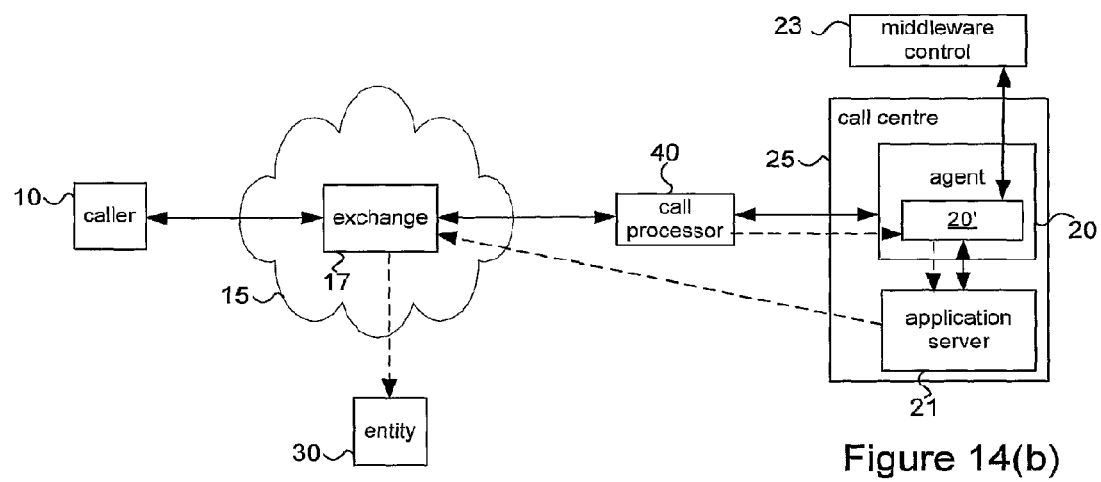
Figure 14C:
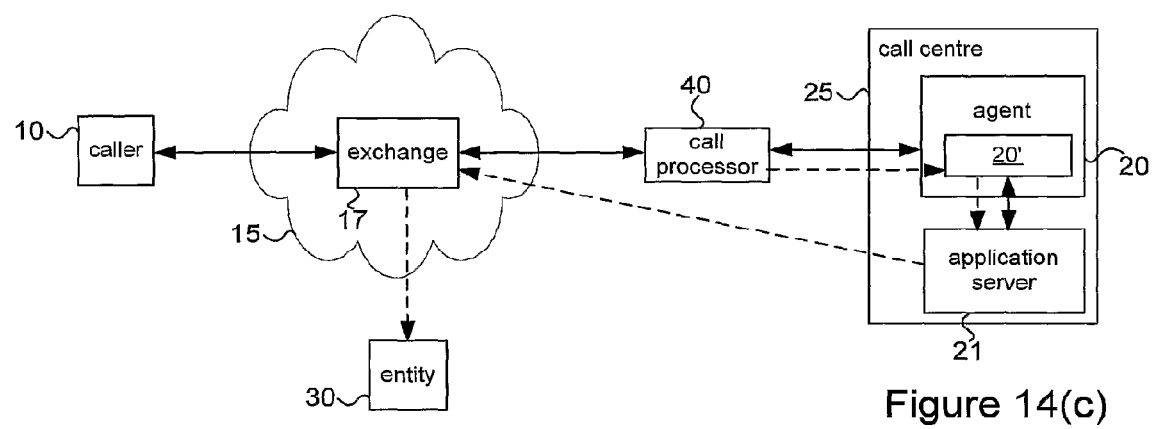
Figure 15:
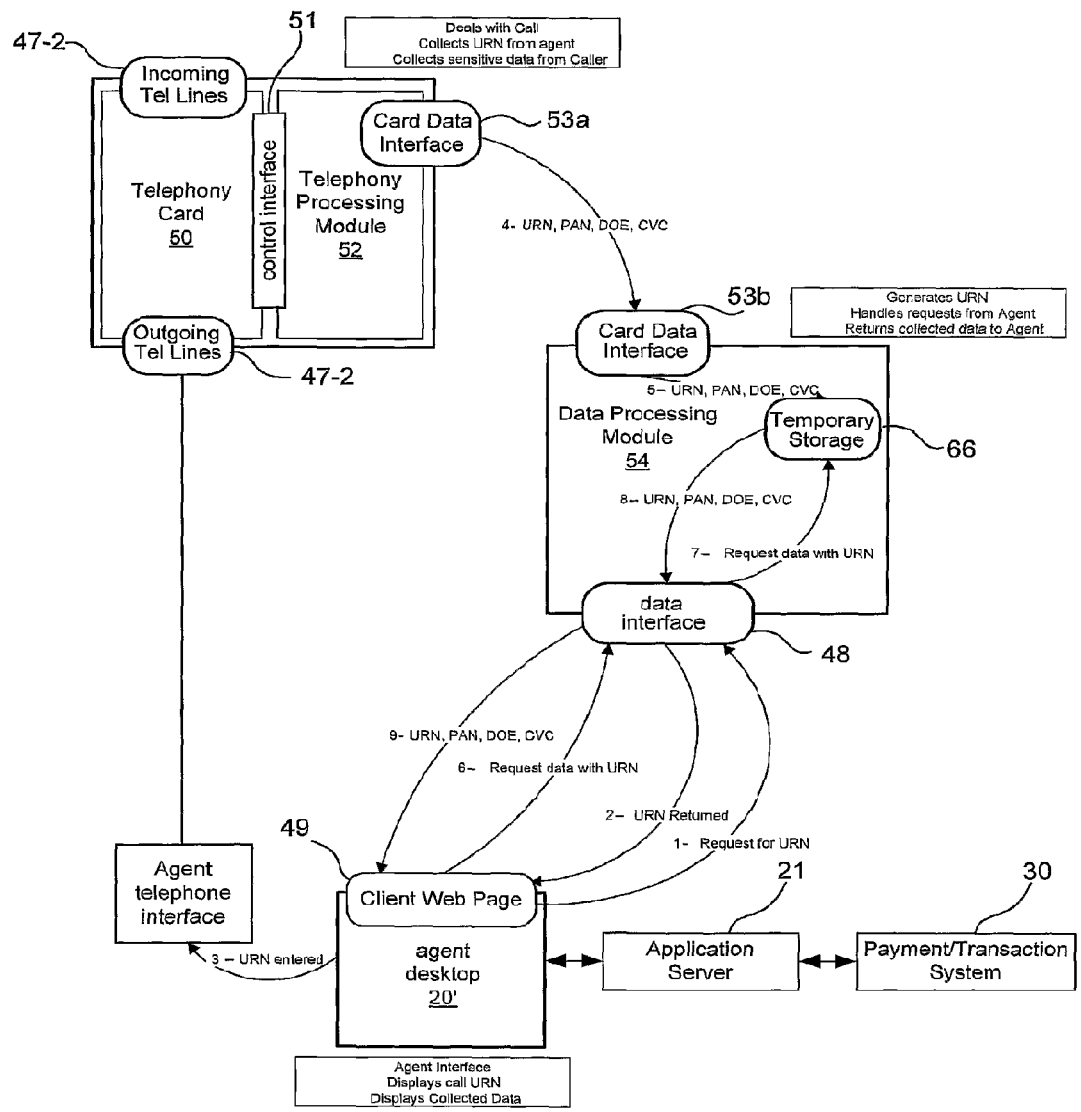
Figure 16:
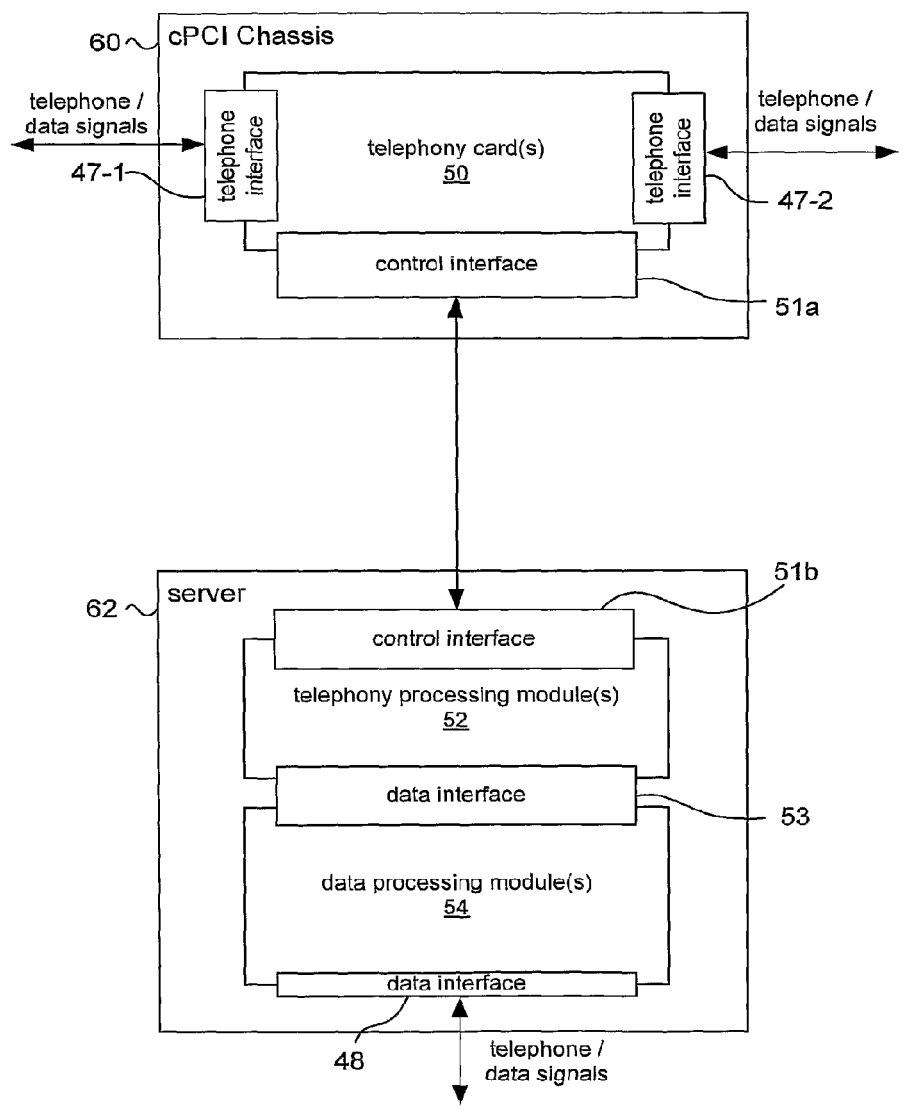
Figure 17:
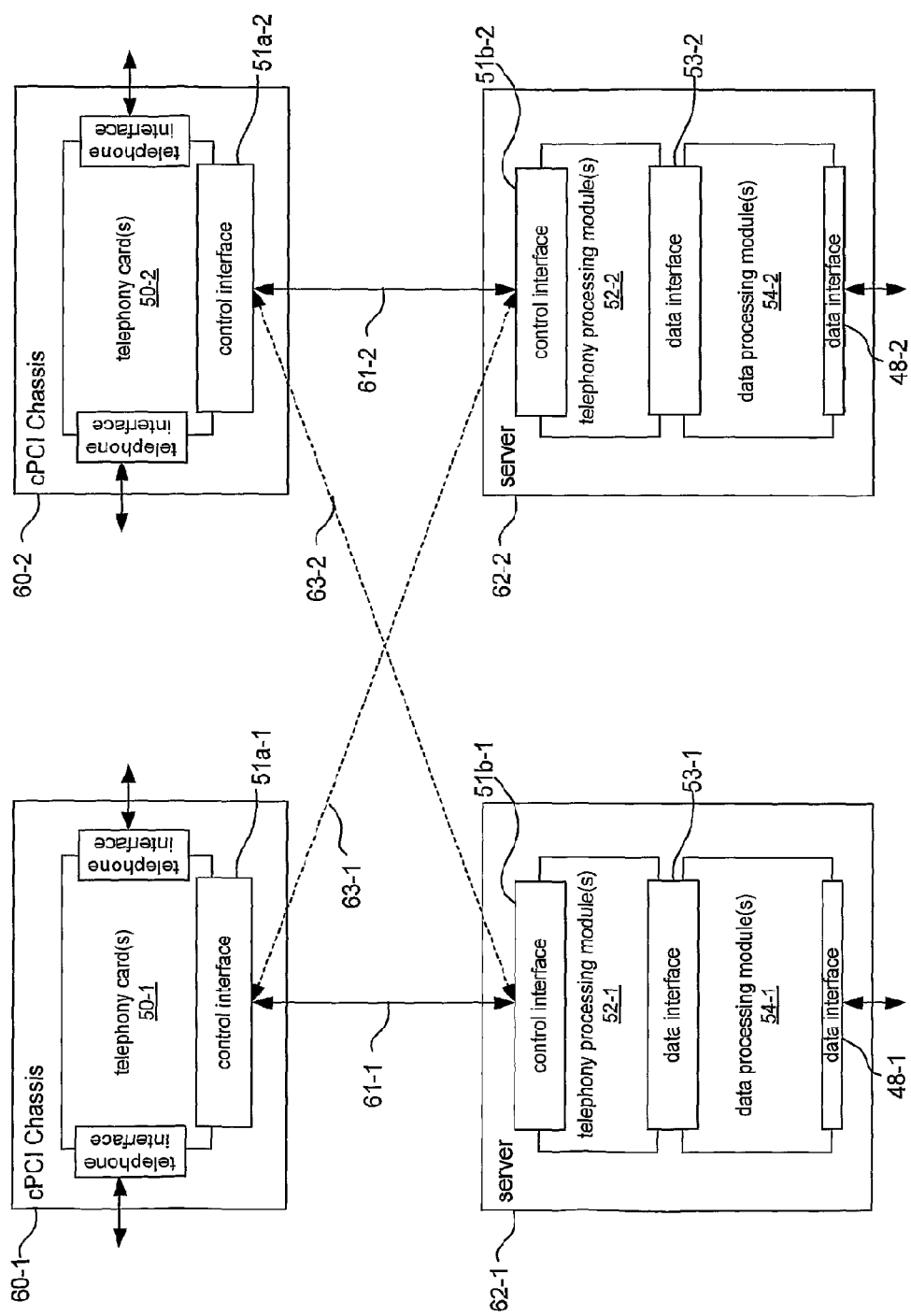
Figure 18:
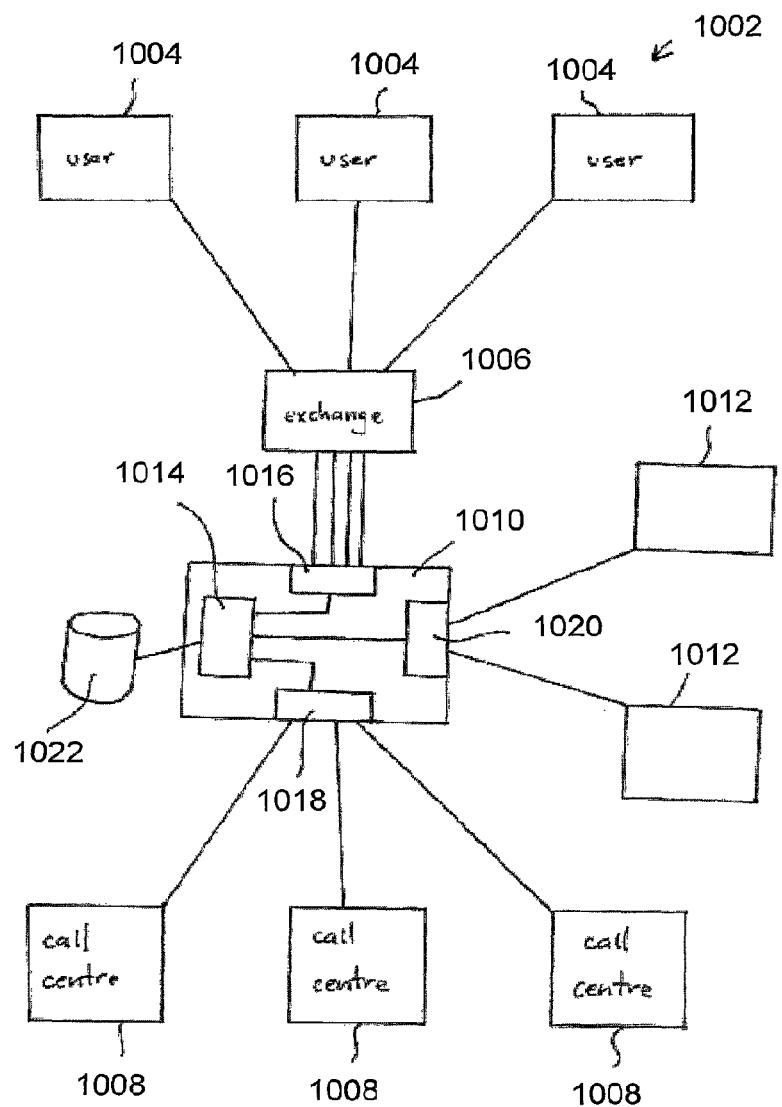

FIGS. 14(a) to 14(c) show different arrangements for different integration options;

FIG. 15 shows part of an operation sequence of operation for some implementations of the call processor;

FIG. 16 is another schematic diagram showing a different arrangement for the modularised call processor as used in the system of the FIG. 2;

FIG. 17 is another schematic diagram showing a different arrangement of modularised call processors as used in the system of the FIG. 2; and FIG. 18 shows a further schematic representation of a telephone network incorporating a system according to the present invention.

Figure 1:
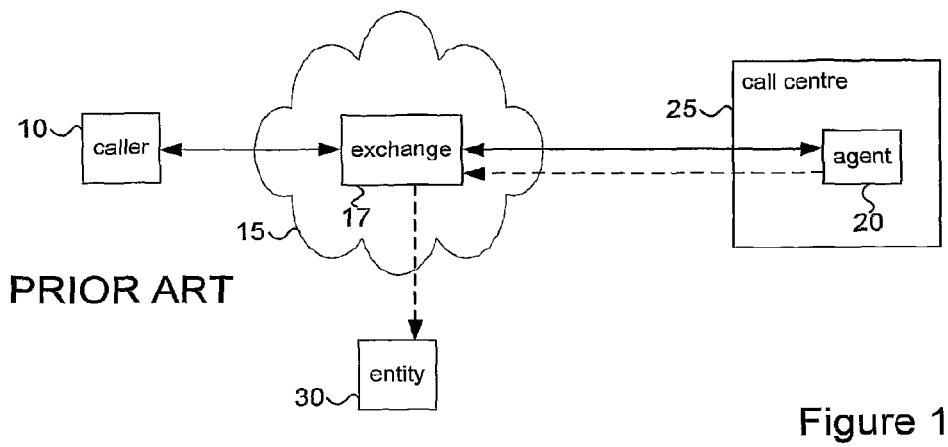
FIG. 1 shows a typical arrangement by which a caller communicates with a call centre, as known in the prior art.

FIG. 1 shows a typical telephone system, as known in the prior art, wherein a caller 10 communicates via a telephone network 15 (comprising one or more telephone exchanges 17) with an agent 20 in a call centre 25. During the communication, caller 10 may be required to participate in a transaction with entity 30 which requires the sensitive data to be passed to the entity 30. In current systems this commonly requires agent 20 to facilitate the transaction and allows them to be privy to the sensitive data.

For example, caller 10 may be seeking to purchase an insurance policy. Upon the caller 10 deciding to purchase a particular policy offered by the agent 20, the agent 20 may invite the caller 10 to pay for the policy electronically and set up the transaction with the caller's bank (entity 30). Typically, this will involve the caller 10 providing the agent 20 with sensitive details such as a debit or credit card number (and associated verification details, such as the card issue number, card expiry date and card security code), and the agent 20 relaying these details to the bank 30. This assumes the agent can be trusted, which unfortunately is not always the case. In some systems, for ease of input and to increase security, there is the facility to allow the caller 10 to input numeric information by means of DTMF or touch-tones. However, there have been cases where these tones have been recorded by untrustworthy agent s 20.

FIG. 2 shows a telephone call processing system according to the present invention, wherein a caller 10 communicates via a telephone network 15 (comprising one or more telephone exchanges 17) with an agent 20 in a call centre 25. The telephone call from the caller 10 to the agent 20 is routed via a telephone call processor 40, located in the call centre 25. Call processor 40 is an intermediary for all such calls between caller 10 and agent 20 and is arranged such that the agent 20 has no means by which to circumvent the call processor 40 and interact with the caller 10 directly. As will be described below, call processor 40 acts to modify characteristics of the telephone call or signal from the caller 10 to the agent 20 and to route data to the entity 30 such that sensitive information from the caller 10 is barred from reaching the agent 20 whilst allowing agent 20 to assist caller 10 in facilitating the interaction with entity 30.

As will be appreciated by those skilled in the art, the modification of the call characteristics is ideally done only during those times when sensitive data is being transmitted by the caller 10.

In this embodiment, call processor 40 is located in the call centre 25; alternative embodiments may be envisaged by those skilled in the art. For example, call processor 40 may be located at a site within the telephone network 15 external to the call centre 25, and exchange 17 configured such that calls from the caller 10 to the call centre 25 are routed via call processor 40. By such means, call processing according to the present invention could be offered by service provider as a service to the call centre 25. In a further alternative, call processor 40 is located at the location of the caller 10, as a part of or in addition to the telephony equipment of caller 10. Thus it can be seen that the call processor 40 could be placed at any point along the telephony network between caller 10 and agent 20, and also be made compatible with any traditional telephony network, including SIP (Session Initiation Protocol) and VoIP (Voice over IP) telephone systems.

Figure 3A:
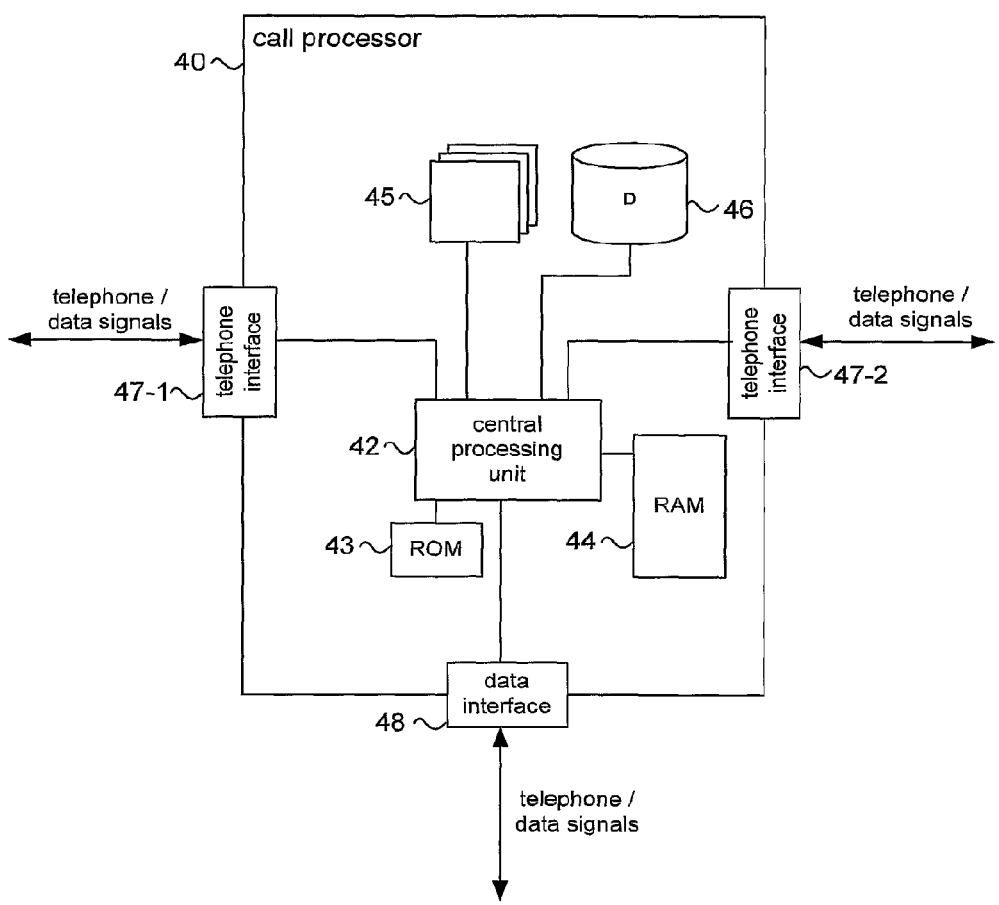
FIG. 3(a) is a schematic diagram showing components of a call processor as used in the system of the FIG. 2.

FIG. 3(a) shows components of the call processor 40, which can be seen to comprise a central processing unit 42, with accompanying read-only memory 43 and random-access memory (RAM) 44, temporary storage 45, a database 46 and a plurality of telephone interface ports 47-1, 47-2 and a data interface port 48 for receiving and transmitting telephone and data signals.

Call processor 40 may be implemented, for example, as a standard PC with a telephony card, such as Prosody X PCI card as supplied by Aculab, of Milton Keynes, UK. In this embodiment, call processor 40 runs the Windows 2003 Server operating system, with a Microsoft SQL 2000 database engine, although it will be appreciated that the invention need not be limited to a particular operating system and system software, so that alternative systems (having undergone appropriate modifications to allow for differences in hardware and software) may, for example, run a variation of UNIX, such as Linux. In yet further alternatives, the call processor 40 need not run server software, or the software may be embedded or hard-coded.

In an alternative embodiment, database 46 is hosted externally to the call processor 40. In a yet further alternative, no database 46 is used at all, the call and data being routed directly.

Call processor 40 operates in one of two modes: "normal" or "safe".

In some embodiments the components of the call processor are modularised. In the embodiment shown in FIG. 3(*b*), for example, the call processor 40 essentially comprises three main modules: a telephony card 50; a telephony processing module (TPM) 52; and a data processing module (DPM) 54.

The telephony card upon which the call processor is based is an exchange-level device, containing its own processor, DSP chip and memory. The card is configured to carry out the main work in splitting a call into its voice and DTMF components for the "safe" (or "secure") mode. This advantageously allows more lines to be allowed for simply by the addition of further telephony cards 50 to automatically add the necessary processor power and memory required to handle calls on the extra lines.

The Telephony Processing Module (TPM) 52 is operable to control each telephony card and, in particular, to oversee gathering of the sensitive data, encryption of sensitive data once collected, and the transmission of data (encrypted as required) to other modules and/or systems. Use of a TPM 52 allows the operation of the call processor 40 to be tailored to suit the specific task it is required to perform. Advantageously, the TPM 52 is not operating-system dependant, and so can be run on any suitable platform (for example, a Windows, Linux or Unix platform). The TPM is configured to communicate with the telephony card 50 over a suitable control interface 51 and with the DPM 54 over a suitable data interface 53. Advantageously, the TPM 52 is operable to communicate with the telephony card 50 over a standard IP network interface (as a skilled person would readily understand) such that it does not need to share a platform with the telephony card 50.

More specifically, the TPM 52 is operable to collect transaction data from a caller during a call via the telephony card 50 and to encrypt the collected data using an appropriate security algorithm (for example, a triple data encryption standard (3DES) cipher algorithm) prior to transmission to the DPM 54 over the data interface 53. In operation, the collected data may be held temporarily in the TPM's memory (RAM) before being encrypted. The keys for the 3DES encryption are preferably defined at system installation. The TPM 52 is further operable, to clear the RAM used for storage of the sensitive (or other) data once it is no longer required (for example, substantially immediately after transmission to the DPM).

The DPM 54 is provided for situations in which sensitive data requires temporary storage until it is required by an external system. The DPM 54 is operable to receive encrypted sensitive data from the TPM 52 over the data interface 53, to store the received encrypted data in a local memory until it is requested by the external system, and to transmit the stored data to the external system via data interface 48 when requested. The DPM 54 is further operable to securely delete the stored data after transmission to the external system. The DPM 54 is configurable to suit specific applications and, like the TPM 52 is not operating system dependant, so can be run on any suitable platform (for example, a Windows, Linux or Unix platform). The TPM and DPM may communicate over any suitable data interface 53. Advantageously, however, the TPM 52 and DPM 54 are operable to communicate over a standard IP network interface (as a skilled person would readily understand), thereby allowing potential installation of the TPM 52 and DPM 54 at different locations.

Figure 3B:
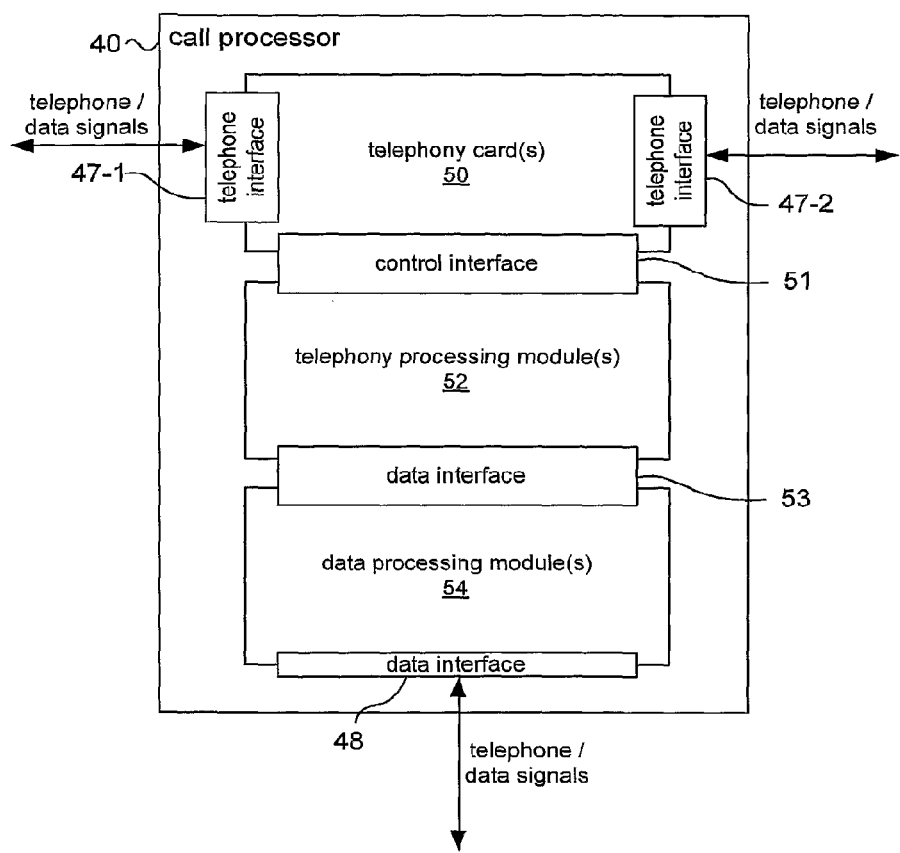
FIG. 3(b) is another schematic diagram showing a modularised call processor as used in the system of the FIG. 2.

In the implementation described with reference to FIG. 3(*b*) the telephony card 50, TPM 52 and DPM 54 are all implemented in a single unit, For example, the telephony card 50 can be located in a server, and the TPM 52 and DPM 54 can run on that server, thereby providing a 'one-box' solution. This implementation is particularly beneficial for applications for which a smaller platform is required. Other implementations, which are particularly well suited for applications requiring larger scale platforms, are described in more detail later with particular reference to FIGS. 17 and 18.

Where the call processor is provided in agent premises such as the call centre 25 (e.g. as described with reference to FIG. 2) the TPM 52, DPM 54 and/or telephony card 50 may be provided as part of an application server (not shown), at the premises. The application server may be configured to handle other transaction related applications relating to, for example, purchase management, transaction logging, maintenance of a transaction database and/or the like.

Figure 4:
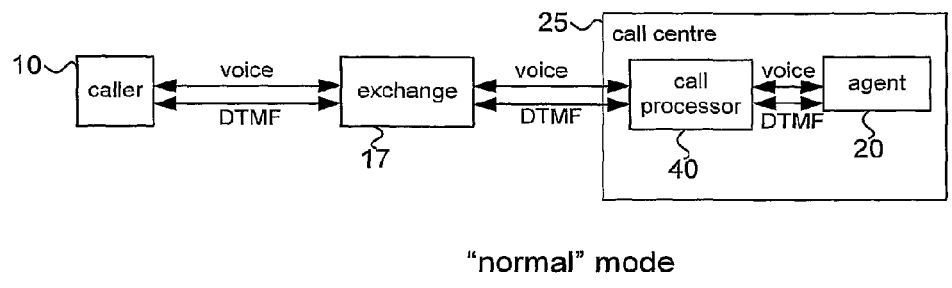
FIG. 4 shows the system of the invention operating in "normal" mode.

FIG. 4 shows the system of the invention operating in "normal" mode. Caller 10 places a telephone call (in the usual way known in the art) to call centre 25 and is connected to agent 20. Call processor 40 merely forwards the telephone call (both voice and DTMF components) without any additional processing. This allows the continued use of DTMF tones for non-sensitive data communication e.g. for selection by the caller 10 of an option from a menu etc by means of IVR (Interactive Voice Response) during those times when sensitive information is not being transmitted. This is done to maintain and not excessively limit telephony features available to the caller 10.

Figure 5:
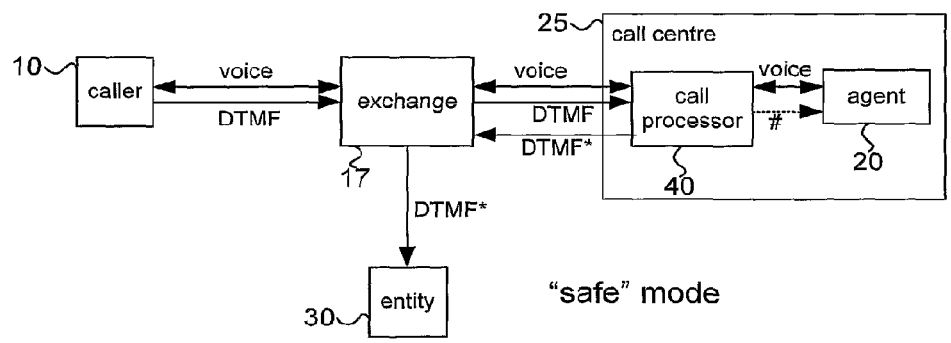
FIG. 5 shows the system of the invention operating in "safe" mode.

FIG. 5 shows the system of the invention operating in "safe" mode. Call processor 40 forwards the voice portion of the telephone call between caller 10 and agent 20 as before. However, the DTMF or touch-tone portion of the telephone call is detected and processed by the call processor 40, which forwards a modified form of the DTMF tomes (labelled "#") to the agent 20 and extracted data (labelled "DTMF*") to the entity 30. The tones received by the agent 20 are modified such that the agent is only aware of the number of DTMF tones input by the caller 10 (thereby to allow feedback regarding input progress to the agent 20), but is unable to determine their identity i.e. which specific DTMF tones were sent. In the present embodiment this modification comprises masking the DTMF tones received from the caller 10 with a single frequency tone which is relayed to the agent for each DTMF tone input by the caller 10. Alternatively, each DTMF tone received from the caller 10 may be masked by a random tone.

The operation of the system will now be described with reference to FIG. 6, which shows the operating sequence of the telephone call processing system. In this example, a caller 10 places a call to a call centre 25 and speaks to an agent 20 who facilitates a payment transaction between the caller 10 and a credit card authority 30. In an optional step, the caller 10 undergoes a further validation procedure via the bank 35. Those skilled in the art will appreciate that a similar procedure could be used with any merchant or for many other transactions.

Figure 6:
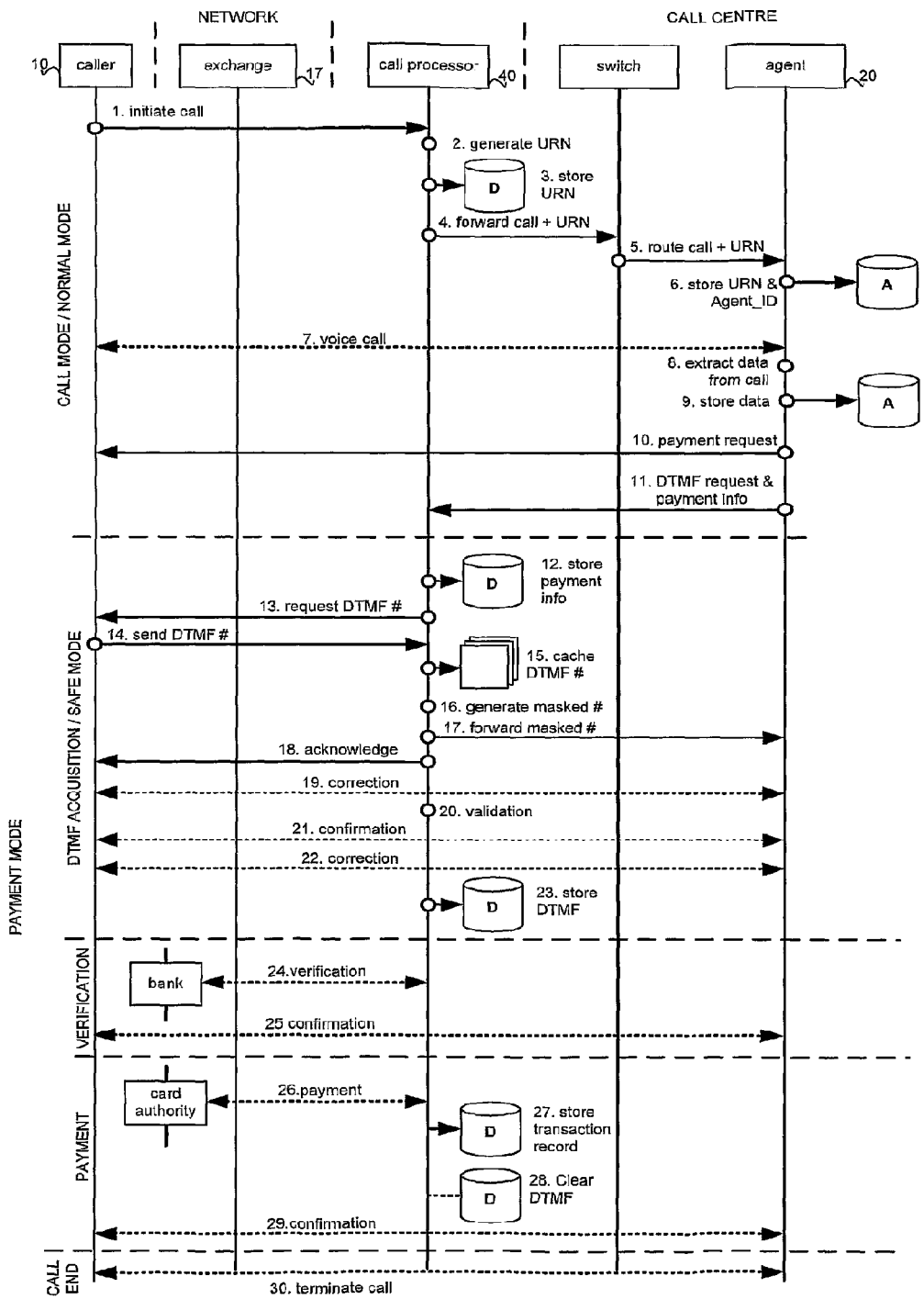
FIG. 6 is a schematic diagram showing the operating sequence of the telephone call processing system.

FIG. 6 also shows a switch located with in the call centre 25. This is used to route the call from the caller 10 to the appropriate agent 20 from the many operating at the call centre 25.

Call Setup

1. Initiate Call

The caller 10 makes a telephone call in standard way. The call is routed via one or more exchanges 17 in the telephone network to the call processor 40.

2. Generate URN

The call processor 40 generates a call identifier, known to those skilled in the art as a uniform resource name (URN). In the present embodiment this is a sequential number which can be used in combination with the date to uniquely identify a particular call placed by a caller 10. Alternative embodiments allow for the URN to be related to phone number (to facilitate identification of caller 10), time-stamped or random.

URNs act as resource identifiers with reference to a namespace—this namespace may be standard or shared (and therefore allow the use of the generated URN with 3rd parties) or private (only usable within the call centre 25 network). Those skilled in the art will appreciate that the URN need not be generated by the call processor 40, but could instead be supplied by the agent 10 or the agent's associated computer system, for example, by means of DTMF tones or CTI (Computer Telephony Integration) signalling over TCP. This flexibility is to allow the call processor 40 to be compatible with (and therefore easily installable into) the largest number of existing call centre configurations.

3. Store URN

The call processor 40 stores the URN in local database D, thereby logging the occurrence of the call. As mentioned previously, alternative embodiments of the present invention have database D located elsewhere, or omit it altogether.

4. Forward Call+URN

The call processor 40 associates the URN with the call and forwards both to the switch at the call centre 25.

5. Route Call+URN

The call centre switch routes the call to an available/suitable agent 20.

6. Store URN & Agent_ID

The URN and the agent identifier are stored in call centre database A, thereby logging which agent 20 handled the call.

Normal Call Mode/Normal Mode

7. Voice Call

Agent 20 and caller 10 interact verbally . . . .

8. Extract Data from Call

As the call progresses, Agent 20 completes an on-screen form from the answers the caller provides to (possibly scripted) questions.

9. Store Data

Data from the completed form is stored in the call centre database. This may initially be stored per call, according to URN; where a database entry already exists for an identified caller, data is appended or amended as required.

Payment Initialisation

10. Payment Request

The Agent 20 requests payment from the caller 10, and initiates the payment procedure.

11. DTMF Request & Payment Info

Agent 20 (manually, or agent software automatically eg. by ActiveX control sending CTI signals) sets call processor 40 to "safe" mode for DTMF acquisition and forwards payment information. The placing of the call processor 40 into "safe mode" is therefore in response to some triggering event.

In this embodiment, the DTMF request is the URN of the call. Alternative embodiments may use, for example, a single activation tone, an alternative alphanumeric sequence (possibly related to a call identifier or caller identifier, such as the URN), possibly in combination with a termination character such as a hash. As those skilled in the art will appreciate, a wide variety of methods of placing the call processor 40 into "safe" mode will assist in compatibility with existing call centre systems.

The payment information may include details of the amount to be paid, details of the payee (e.g. a merchant identifier), a reference number (e.g. a unique transaction/order identifier), possibly also details of the caller, bank account details (other than the PIN number or any other security features)—necessary and sufficient, according to whatever information is already stored by the system or has already been pre-arranged, to set up the payment transaction—barring the security detail.

Those skilled in the art will be able to contemplate a number of alternative scenarios regarding acquisition, processing and forwarding of the payment information to enable maximum compatibility with existing systems. For example:

Call processor 40 collects all or part of the card number from the caller 10 and passes this information to the agent's system or database A directly, bypassing the agent 20. The remainder of the card details can then be collected by the agent 20 by the usual method.

Call processor 40 is passed the amount to collect and the card type (e.g. Mastercard, Visa etc) by the agent application via CTI. The card number may be passed by DTMF tones from the caller 10 to the call processor 40, which then contacts the bank or other financial institution and verifies the payment via a secure external connection. The call processor 40 then indicates to the caller 10 and the agent 20 that the payment has been completed successfully, and also sends information back to the agent's system about the transaction (e.g. by means of a transaction URN). This method ensures that the card details never pass beyond the call processor 40 and the financial institute's systems.

Call processor 40 requests from the caller 10 the card number, type and password/PIN number. These are then transmitted securely to the appropriate financial institution for verification, the outcome being indicated to the caller 10 and agent 20 by means of speech recordings.

Exemplary embodiments in which card details are passed to the agent's system or database without the being divulged to the agent are described later with reference, in particular, to FIGS. 14(a) to 15.

Exemplary embodiments in which sensitive information such as card details are passed by the call processor for verification by a third party entity, without being sent to the agent or the agent's system are described in more detail later with reference, in particular, to FIG. 12.

DTMF Acquisition/Safe Mode once the call processor 40 enters DTMF acquisition/"safe" mode, DTMF tones from the caller 10 are blocked by the call processor 40 and prevented from reaching the agent 20 (or even the call centre switch). Normal voice communication however proceeds uninterrupted.

12. Store Payment Info

The call processor 40 stores details for the payment transaction.

13. Request DTMF #

The call processor 40 requests DTMF tones from the caller 10. This may have a single initial prompt (as in a pre-recorded voice) or a prompt per DTMF tone (or group of tones) requested, perhaps given as feedback as the DTMF tones are input by the caller 10.

It will be appreciated that the DTMF tones could, beneficially, be requested by the agent since the voice channel between the caller and agent remains open.

14. Send DTMF #

Caller 10 inputs a (single) DTMF tone . . . .

15. Cache DTMF #

Call processor 40 caches the DTMF # (encrypted) in temporary storage 45.

16. Generate Masked #

Call processor 40 generates a masked tone (e.g. unrelated to the received DTMF tone)—or, alternatively, mutes it.

17. Forward Masked #

Call processor 40 forwards the masked tone via the switch to agent 20, thereby providing audible feedback as to progress of the DTMF input process. This feedback may also involve a visual indicator, for example an asterisk, to be displayed on the agent's video display screen.

Hence, when the caller 10 presses a keypad button during the conversation with the agent 20 whilst call processor 40 is in "safe" mode, the caller 10 will hear the appropriate DTMF tone as usual, but the agent 20 will only hear a generic tone which cannot be related to the specific DTMF tone as generated and heard by the caller 10.

18. Acknowledge

Call processor 40 acknowledges the input of the DTMF tone. As this acknowledgement is for the caller only, the DTMF tone which was input may itself be replayed. Alternatively, a sound file of the alphanumeric the DTMF represents could be played.

19. Correction

If the caller 10 realises an incorrect DTMF tone has been input, the caller 10 informs agent 20 who can delete previous entry/alphanumeric or reset the entire cache. Alternatively, a facility for the caller to 'backspace' may be provided. In the present embodiment, only the " " "and" # "keys of the keypad can be used by the caller 10 are used for so-called special functions. Currently," " " is used by caller 10 to delete the entire number currently being input, and "#" is used as a termination character to signal the end of the inputting of the number currently being input. Those skilled in the art will appreciate that alternative functions could be assigned to these keys. For example, " " could be used as for a "backspace" function, and "#" could be used to trigger a synthesised reading out of the digits entered do far (thereby enabling the caller 10 to check for input errors).

Steps 13-19 are repeated in loop as required to acquire the necessary information. This may depend on the number of DTMF tones input (e.g. 16 digits for a credit card number), or else be determined by a termination tone e.g. the caller 10 keying a hash.

20. Validation

Optionally, the call processor 40 checks that complete DTMF sequence is valid (e.g. 16 digits for a credit card, correct format used for date-of-birth etc). If the sequence is invalid, caller 10 and agent 20 are notified—and possibly the acquisition sequence is started again.

21. Confirmation

The caller 10 is informed that the complete DTMF sequence is valid. This may be done verbally by the agent 20, who will have received feedback as to the progress of the DTMF acquisition, or by the call processor 40, for example by replaying sound files for the complete sequence. In the latter case, the previous step of validation by the call processor 40 is advisable.

22. Correction

As previously, caller 10 is given option to correct errors.

23. Store DTMF

Optionally, call processor 40 stores DTMF data (encrypted) to local database D. Storage is preferably encrypted form rather than as raw DTMF tones or as decoded information.

In more secure systems, DTMF tones (or derived information) are only ever stored temporarily (e.g. kept in the call processor 40 cache) for transmission during the current call session.

Once DTMF acquisition is completed, call processor 40 exits DTMF acquisition mode/safe mode, and DTMF tones from the caller 10 are no longer blocked by the call processor 40 and no longer prevented from reaching the agent 20.

The DTMF information may optionally be passed to the call centre 25, but if so it is first translated into non-DTMF form (and encrypted) so that it cannot be intercepted/recorded/decoded by the agent 20.

Verification

24. Verification

This is an optional step, wherein transaction is authorised via a third party verifying entity 35 e.g. a bank. Call processor 40 sends minimum sufficient detail e.g. user account no., payment amount and caller's security authorisation (as decoded from the DTMF tones) to the bank 35 over a secure/encrypted link.

This may be done according to known a standard (e.g. 3D Secure, aka Verified by Visa/Mastercard SecureCode), where the caller 10 has pre-registered their credit card with a 3D-secure scheme and established a password. Verification then involves the call processor 40 passing to the verifying bank 35 the caller's card details and the password as obtained by the call processor 40 from the caller 10 by means of DTMF tones.

The URN may be forwarded if the third party 35 understands the namespace being used by the call processor 40 and call centre 25. In a further alternative, other information obtained from the telephone network, such as the telephone number caller 10, may be forwarded to the verifying entity.

25. Confirmation

Call processor 40 informs caller 10 and agent 20 that verification has been confirmed (in which case payment may proceed)/or not.

Payment

26. Payment

Call processor 40 initiates payment by forwarding payment details to the card authority 30—only those details necessary to effect the payment are forwarded. In an alternative, no credit card details are forwarded, only a reference number.

27. Store Transaction Record

Call processor 40 stores information relating to the payment in local database D.

28. Clear DTMF

If the call processor 40 is to store DTMF information only temporarily, it is cleared 29. Confirmation Confirmation is given to caller 10 and to agent 20 that payment has been made. This may be a pre-recorded message issued by the call processor 40, or a confirmation signal may be sent from call processor 40 to the agent 20 (or agent software) and the agent 20 informs the caller 10.

Call End

30. Terminate Call

The call ends in conventional manner, initiated either by caller 10 or Agent 20.

FIGS. 7 to 10 show flow diagrams for the operation of certain aspects of the telephone call processor 40.

Figure 7:
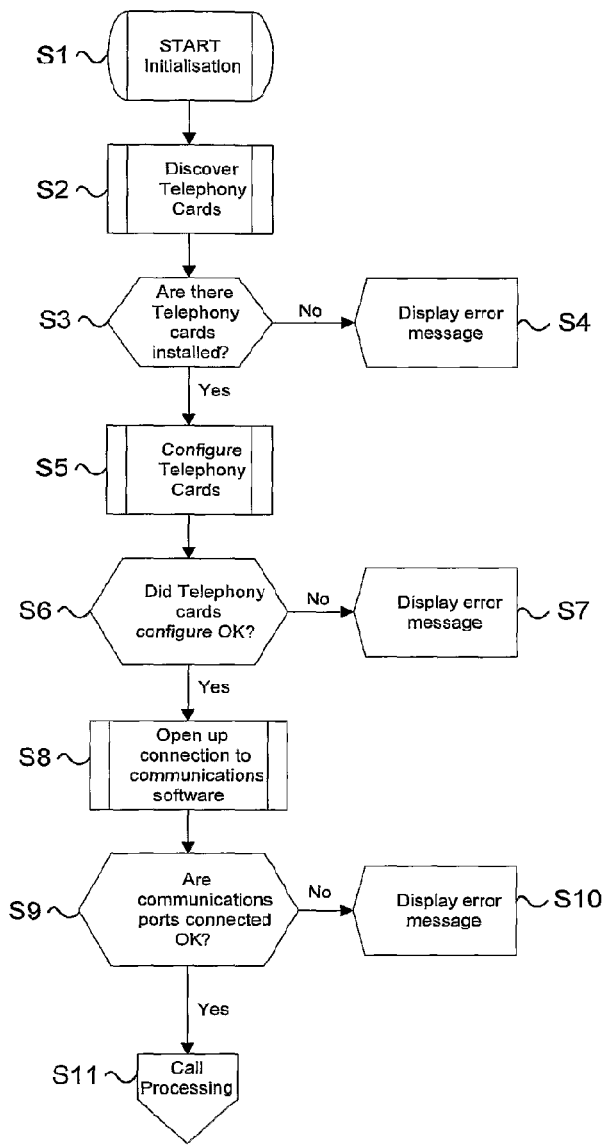
FIG. 7 is a flow diagram showing the call processor initialisation procedure.

FIG. 7 shows the call processor initialisation procedure. This procedure is run when the call processor 40 is first activated and after it is reset. The initialisation procedure begins at step S1. At steps S2 to S6 the call processor 40 searches for installed telephony cards and configures them appropriately. At steps S8 to S10 the call processor 40 loads and runs the communications software and tests the telephone/data interface ports (47-1, 47-2 and 48). Appropriate error messages are displayed (at steps S4, S7 and S10) if problems are encountered. If the initialisation procedure is completed successfully, the operation of the call processor 40 continues to the call processing procedure at step S11.

Figure 8:
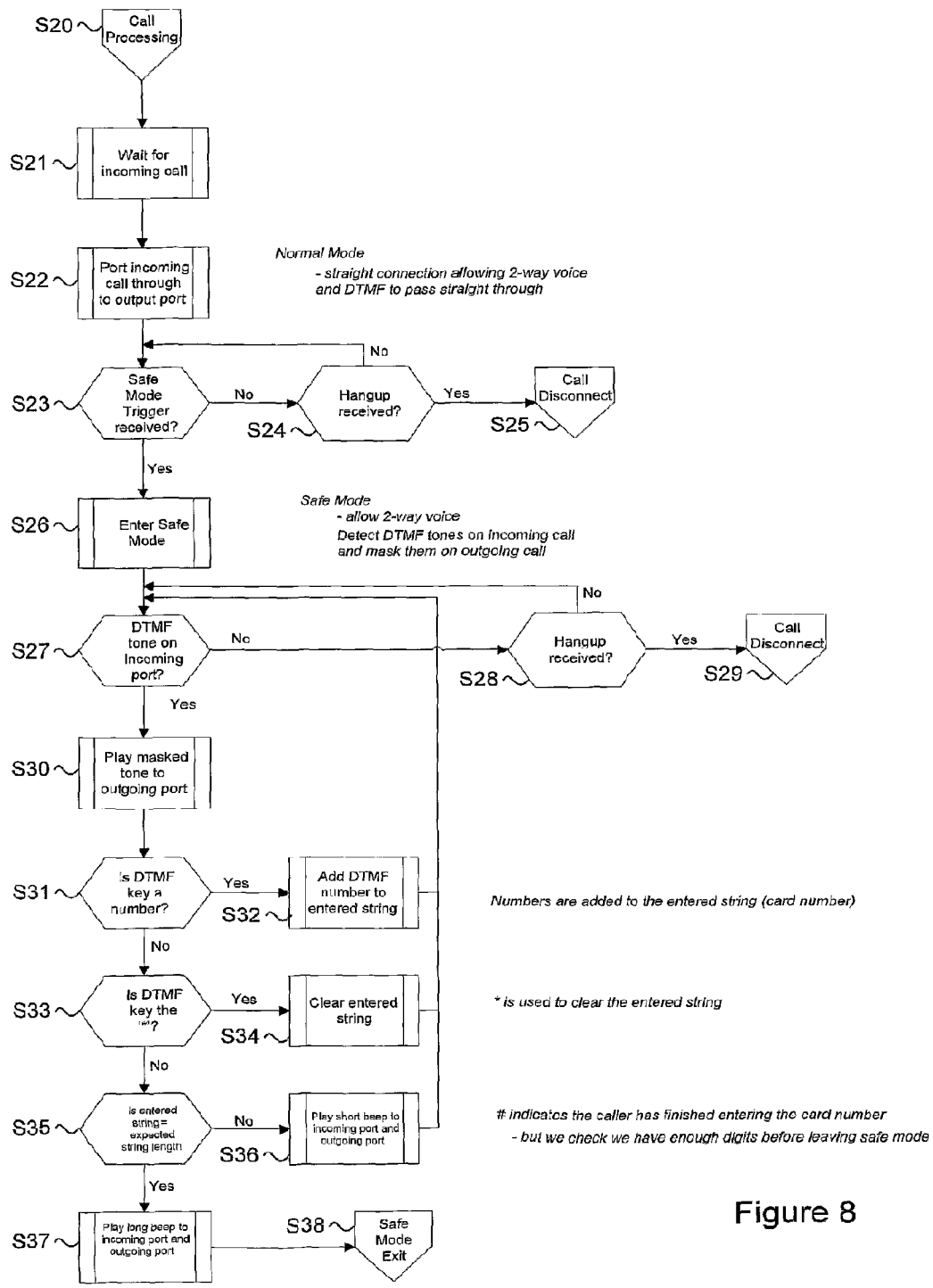
FIG. 8 is a flow diagram showing the call processing procedure.

FIG. 8 shows the call processing procedure. This procedure is the main processing procedure of the call processor 40, which governs the acquisition of DTMF tones in "safe mode". The procedure starts at step S20, and call processor 40 is placed in a waiting state (step S21) for an incoming call. When a call is received (at telephone interface 47-1) it is routed to telephone interface 47-2 at step S22. The call progresses normally, with the caller 10 and agent 20 interacting verbally in a two-way conversation. At step S23 the call processor 40 is placed in a monitoring state alert to either caller 10 or agent 20 sending the trigger (via telephone interface port 47-1 or 47-2 respectively) for placing the call processor 40 into "safe mode". The monitoring state includes checking at step S24 for whether either caller 10 or agent 20 has hung up; if so, the call processor 40 proceeds to execute the call disconnect process at step 25. If the "safe mode" trigger has been received, the call processor enters "safe mode" at step S26.

As previously described, "safe mode" allows for two-way conversation between caller 10 and agent 20 whilst detecting incoming DTMF tones from caller 10 and masking them when forwarding the call to the agent 20.

At step S27 the call processor 40 is placed in a monitoring state alert to receiving a DTMF tone from the caller 10 (via telephone interface port 47-2). The monitoring state includes checking at step S28 for whether either caller 10 or agent 20 has hung up; if so, the call processor 40 proceeds to execute the call disconnect process at step 29. If a DTMF tone is received from the caller 10, call processor 40 plays a masked or masking tone to the agent 20 (via telephone interface port 47-2) at step S30. There follow a series of checks to determine the nature of the DTMF tone received:

If at step 31 the received DTMF tone is determined to be a number, such as a digit of a credit card number, the number is added to the appropriate string variable representing the credit card number in the call processor 40 memory (either RAM 44 or temporary storage 45) at step S32 and the call processor 40 returns to step S27 to await the next DTMF tone If at step 33 the received DTMF tone is determined to be the "*" character, the appropriate string variable is cleared (i.e. the entire number currently being input is deleted) at step S34 and the call processor 40 returns to step S27 to await the next DTMF tone If at step 35 the length of the appropriate string variable when compared to the expected string length is determined too short (i.e. the credit card number is incomplete), a warning beep is sounded at step S36 to both caller 10 (via telephone interface port 47-1) and agent 20 (via telephone interface port 47-2) and the call processor 40 returns to step S27 to await the next DTMF tone. Caller 10 may have indicated by inputting a terminating "#" character that they perceived their input of DTMF tones was complete, but the check of step 35 is performed anyway to prevent the call processor 40 exiting "safe mode" too early At step S37 the call processor 40 determines that the correct number of DTMF tones has been input and that it is safe to initiate the procedure to exit "safe mode" at step S38.

Figure 9:
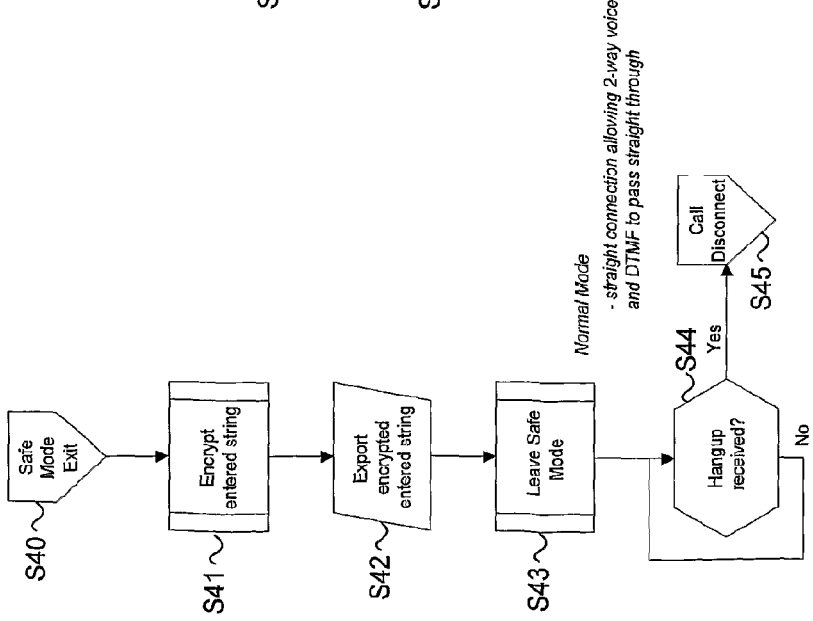
FIG. 9 is a flow diagram showing the procedure for exiting "safe mode"

FIG. 9 shows the procedure for call processor 40 exiting "safe mode". The procedure starts at step S40, and at step S41 the string variable in which the accumulated DTMF tones have been stored during the "safe mode" acquisition stage is encrypted. The encrypted string (representing, for example, the credit card number of caller 10) is then exported at step S42 via data interface 48 to the third party, such as card authority 30. It is only then, at step S43, that the call processor 40 exits "safe mode". The call processor 40 then reverts to handling communication between caller 10 and agent 20 normally, and is placed in a monitoring state which includes checking at step S44 for whether either caller 10 or agent 20 has hung up; if so, the call processor 40 proceeds to execute the call disconnect process at step 45.

Figure 10:
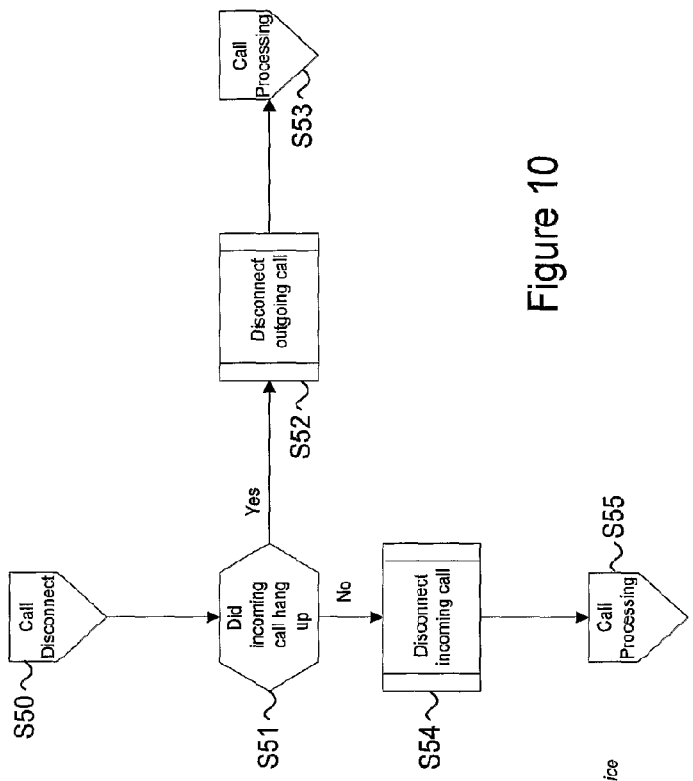
FIG. 10 is a flow diagram showing the call disconnection or termination procedure.

FIG. 10 shows the call disconnection or termination procedure. The procedure starts at step S50, and at S51 the call processor checks whether the caller 10 (who has placed incoming call via telephone interface port 47-1) has hung up. If so, the agent 20 is disconnected at step S52; if not, the caller 10 is disconnected at step S54. In either case, the call processor 40 is returned (via step S53 or S55 respectively) to the call processing procedure, starting at step S20 of FIG. 8.

Figure 11:
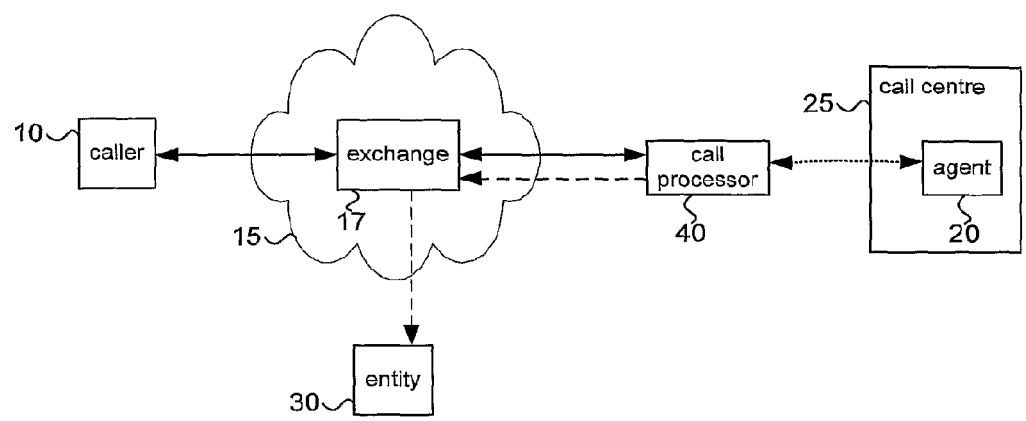
FIG. 11 shows an alternative arrangement of the elements of the invention, wherein the call processor is located outside the call centre.

FIG. 11 shows an alternative arrangement of the elements of the invention, wherein the call processor 40 is located outside the call centre 25. This arrangement would be suitable for situations where the call processor 40 is kept physically separate from the call centre 25 for reasons of security (in which case it may even be located in a different country from that of the call centre 25), or for where the call processor 40 is used by a service provider to provide call processing services to the call centre 25.

Figure 12:
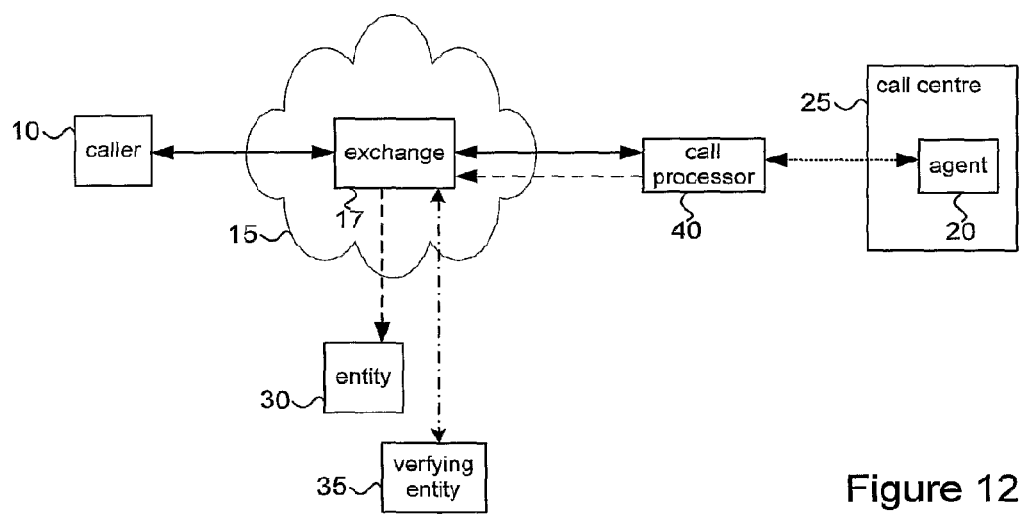
FIG. 12 shows another embodiment of the invention, wherein an additional verification stage is used.

FIG. 12 shows another embodiment of the invention, wherein an additional verification stage is used. This corresponds to the stage shown in FIG. 5, steps 24 and 25, entitled Verification. In this embodiment, before proceeding with the transaction with entity 30, the call processor 40 verifies details provided by the caller 10 with verifying entity 35. Only upon receiving confirmation from the verifying entity 35 does the call processor 40 proceed with the transaction with entity 30. One example of such a verification stage will be known to those skilled in the art as 3D Secure system used by certain credit card companies, which is also known as Verified by Visa/Mastercard SecureCode.

Hosted Payment Gateway

In the embodiments shown in and described with reference to FIGS. 11 and 12 the call processor 40 effectively acts as a hosted (voice) payment gateway which provides means by which a merchant can ensure compliance with the payment card industry (PCI) data security standard (DSS)

through the use of the call processor, effectively allowing the merchant to outsource its responsibilities to a trusted system comprising the call processor 40.

Figure 13:
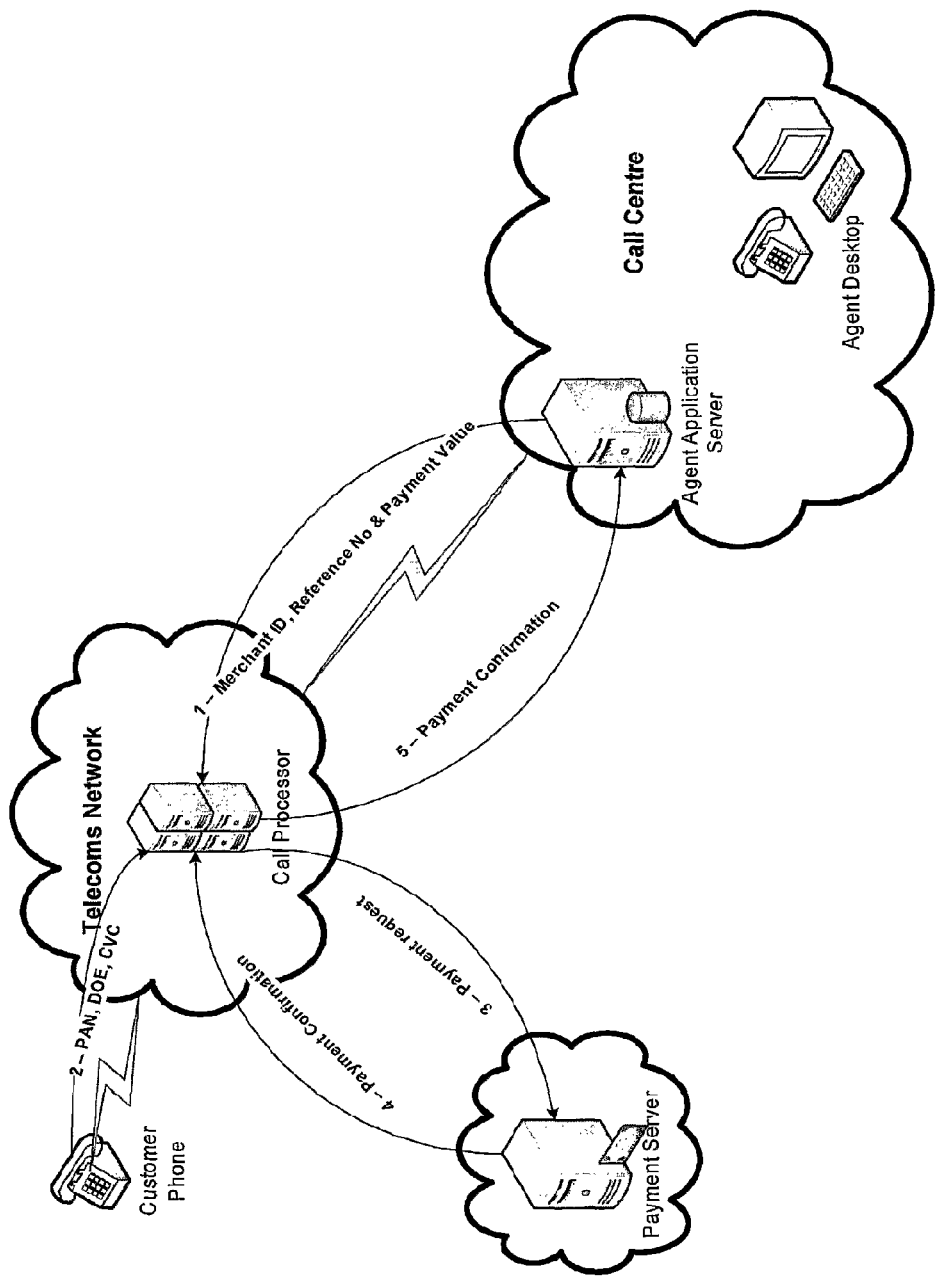
FIG. 13 shows the call processor in operation as a hosted gateway.

In the hosted model, the call processor 40 (or the telephony card 50 part of the call processor) preferably resides in a telecomm provider's infrastructure. In operation payment card data would be collected from the caller using DTMF as described previously, and call centre 25 associated transaction data (e.g. merchant ID, payment reference, and transaction value) would be sent from the call centre 25. Accordingly, all the data needed to process the transaction is assembled at the call processor 40. This process is illustrated in FIG. 13.

Once the data is assembled, the call processor 40 routes the data to a payment handling entity 30/35 for payment processing. The entity 30, 35 provides the appropriate response (authorisation success or failure) back to the call processor 40, which then communicates (via a voice and/or data link) the authorisation success or failure to the call centre agent 20 for appropriate action.

Beneficially, therefore, the payment is completed in a PCI compliant environment and accordingly there are no PCI implications for the call centre 25 as well as all the other benefits (such as keeping payment card details away from call centre agents, improving caller perception etc).

System Integration

FIGS. 14(*a*) to 14(*c*) illustrate different options for simple integration of the call processor 40 into existing systems for acquiring payment information and/or handling transactions at a call centre.

Option 1—Full Integration with Payment Engine

In FIG. 14(*a*) an implementation is shown in which the call processor 40 is located outside the call centre 25, and in which the call processor 40 is adapted to transmit sensitive information, such as card details, collected whilst operating in safe mode (e.g. corresponding to the DTMF ACQUISITION/SAFE MODE stage in FIG. 5—steps 13 to 23) directly to an application server 21 at the call centre, thereby by-passing the agent. The application server 21 is adapted to handle the transaction (including any verification stage) using the sensitive data essentially as if the data had been collected directly by the agent. The application server 21 is further operable to filter the information received from the call processor for display on the agent's desktop to hide or obscure sensitive information whilst allowing the agent to see the progress of the transaction and/or confirm when it is completed successfully.

Accordingly, the call processor 40 is configurable for integration with an existing call centre system payment system with little or no modification to the applications running on the agent's desktop and only relatively minor changes to existing transaction handling applications on the application server 21 to allow it to receive and interpret data received from the call processor.

Option 2—Desktop Middleware

The implementation shown in FIG. 14(*b*) is similar to that shown in FIG. 14(*a*). However in this implementation the call processor 40 is adapted to transmit sensitive information, such as card details, collected whilst operating in safe mode (e.g. corresponding to the DTMF ACQUISITION/SAFE MODE stage in FIG. 5—steps 13 to 23) to a dedicated application or applet ('middleware') running on the computer 20' of the agent 20 (agent desktop) handling the call. The middleware is operable to retrieve the sensitive data from the call processor 40 and to pass it to an application server 21 without revealing it to the agent 20. The application server 21 is adapted to handle the transaction (including any verification stage) using the sensitive data essentially as if the data had been collected directly by the agent 20. The middleware may be operable to allow the information received to be displayed on the agent's desktop in a hidden or obscured manner (possibly allowing the agent to see the progress of the transaction without revealing the sensitive data). The obscured information may be displayed by the middleware in a web page provided on the agent desktop 20' to reduce the impact of integration on any existing agent transaction handling application.

The middleware is configured and controlled centrally by a middleware controller 23 which may be located remotely from the call centre for reasons of enhanced security.

Accordingly, the call processor 40 is configurable for integration with an existing call centre system payment system with little or no modification to existing transaction handling applications on the application server 21.

Option 3—Manual Inputs

The implementation shown in FIG. 14(*c*) is particularly beneficial for integration of the call processor into an existing system without the need to modify existing transaction handling applications at the call centre 40 either on an agent desktop 20' or in an associated application server 21. In this implementation the call processor 40 is adapted to transmit sensitive information, such as card details, collected whilst operating in safe mode (e.g. corresponding to the DTMF ACQUISITION/SAFE MODE stage in FIG. 5—steps 13 to 23) for display on a graphical interface (e.g. a secure web page interface) running on an agent desktop 20' of the agent 20 handling the call. The data is provided to the graphical interface securely over an encrypted connection (e.g. a secure socket layer (SSL)), communication via which is restricted to specific devices (e.g. agent desktops of specific trusted agents) on which the correct SSL certificate is installed. The SSL certificate may be specifically generated for the particular call centre 25 or agent 20 in preference to certificates obtained from certification authorities. Accordingly, interception of the sensitive data (for example by recording DTMF tones) within the call centre, before it reaches the agent, is prevented or at least severely inhibited.

The sensitive data is displayed in the graphical interface on the agent desktop 20' where the agent is able to 'cut and paste' (in the standard manner) it into a transaction handling application on their desktop 21. It will be appreciated that whilst this implementation advantageously takes advantage of the flexibility, provided by the call processor, for secure data communication to a trusted agent, the agent desktop (or applications thereon) could, nevertheless, be adapted such that data displayed is obscured from the agent (or encrypted) whilst still allowing the cut and paste operation.

Data Transmission Security within the Call Processor

The design of the call processor 40 and in particular its modularisation is particularly beneficial given the sensitive nature of the data handled by the call processor 40. Specifically, the modular configuration of the call processor 40 described with reference to FIG. 3(*b*) allows the integration of additional security modules at each transmission and storage point, thereby providing the flexibility to customise the call processor, where necessary for compatibility with a specific specialised security model.

FIG. 15, illustrates one example of how the components of the call processor 40 may be configured to operate for secure transmission of data and secure temporary storage within the modules of the call processor. The operation is particularly relevant to the implementations described with reference to FIGS. 14(*b*) and 14(*c*). It will be appreciated, however, that the principles embodied by this example are more generally applicable to other implementations of the call processor 40 such as those described elsewhere.

The sequence of operation shown in FIG. 15 will now be described in greater detail by way of example only:

Call Setup

Initially the caller 10 initiates a telephone call in standard way as generally described with reference to step 1 in FIG. 6. The call is routed via one or more exchanges 17 in the telephone network to an agent 20 via incoming and outgoing telephone/data interfaces 47-1 and 47-2 of the telephony card 50 of the call processor 40.

At this stage the call processor is operating in its 'normal' mode in which the call processor is essentially transparent to both the voice and the DTMF components of the call.

1. Request of URN

After receipt of the call the agent 20 responsible for handling the call initiates a request for a URN via a graphical interface 49 comprising a client web page provided on the agent desktop 20'. It will be appreciated that the request could be initiated automatically by the agent desktop (e.g. using middleware installed on the desktop) before, after, or in response to the call being answered by the agent. The request is routed from the graphical interface 49 to the data interface (effectively a 'client web page interface') 48 of the DPM 54.

2. URN Returned

The DPM 54 is operable to generate a URN for the call and to return it via the data interface 48 to the graphical interface 49 for display to the agent. The agent 20 and caller 10 interact verbally and, as the call progresses, the agent 20 completes an on-screen form from the answers the caller provides as generally described previously. It will be appreciated that the URN may be requested/generated at any time during this part of the call.

When a payment is required, the agent 20 requests payment from the caller 10, and initiates the payment procedure.

3. URN Entered

The agent enters the URN (e.g. using a telephone keypad of the telephone equipment the agent is using for the call) for transmission as DTMF tones to the TPM 52 via the outgoing telephone interface 47-2 of the telephony card 50. It will be appreciated that the URN could also be sent automatically by an application (e.g. middleware) installed on the agent desktop 20'.

In this embodiment, therefore, the transmission of the URN acts as a trigger for initiating the payment procedure and for causing the call processor 40 to enter the safe mode in which the voice component of the call is allowed to pass to the agent whilst the DTMF component is blocked or masked.

The TPM 52 of the call processor 40 is operable to store the URN, thereby logging the occurrence of the call, and to associate the URN with the call. The TPM 52 is further operable to collect transaction data from the call (e.g. a personal account number (PAN), card verification code (CVC), date of expiry (DOE) etc.) and to store the collected data temporarily in RAM.

4. Transmission of Transaction Data to DPM the TPM 52 is operable to encrypt the collected data, in association with the URN for the call, using an appropriate security algorithm (for example, a triple data encryption standard (3DES) cipher algorithm) prior to transmission to the DPM 54 over the data interface 53a, 53b. The keys for the 3DES encryption are defined at system installation. Once transmitted, the RAM used for the temporary storage is overwritten to delete the data. The URN may be encrypted with (or separately from) the sensitive transaction data, or may be sent in an unencrypted form in association with the encrypted transaction data.

5. Storage of Encrypted Data

Once the encrypted transaction data and the URN have been received over the data interface 53a, 53b, the DPM 54 will pass the data to a temporary storage module 66 for storage of the data, still encrypted using 3DES, in a local storage area (RAM). This data is stored until requested via the graphical interface ('Client Web Page') on the agent desktop.

6. Agent—DPM: Request Data with URN

When transaction data collection has been completed, the agent 20 responsible for handling the call initiates a request for the desktop via the graphical interface 49 on the agent desktop 20' It will be appreciated that the request could be initiated automatically by the agent desktop (e.g. using middleware installed on the desktop). The request is routed from the graphical interface 49 to the data interface 48 of the DPM 54. It will be further appreciated that the data could potentially be requested after termination of the call although it may be preferable to verify the transaction data and confirm the transaction while the call is still taking place.

The request preferably comprises the URN of the call during which the data being requested has been collected.

For enhanced security, the data ('Client Web Page') interface 48 of the DPM 54 comprises a secure socket layer (SSL) socket on a specified port (as opposed to a standard SSL port). The SSL socket is controlled by an SSL certificate, which is a special certificate generated specifically for secure communication with the DPM 54 and, accordingly is not attributed to a standard Certificate Authority.

To allow secure communication via the data interface 48, therefore, the agent desktop 20' has the SSL certificate required to use the SSL socket installed. The appropriate SSL certificate must be manually installed on the agent desktop 20' before communication can take place. Accordingly, the transaction data cannot be retrieved via a computer that does not have the correct certificate installed.

7. Data Interface—Temporary Storage Module: Request Data with URN

The DPM 54 is operable, on receipt of a request for the transaction data from a suitably authorised agent desktop 20', to request the transaction data associated with the URN from the temporary storage module 66.

8. Extraction of Transaction Data with URN

The temporary storage module 66 of the DPM 54 reads and decrypts the transaction details and passes them for transmission over the data interface (SSL port) 48. Once the transaction data has been passed to the data interface 48 the temporary storage module 66 clears the RAM of the requested sensitive data (e.g. by overwriting it) for additional security.

9. Transmission of Transaction Data with URN

The DPM 54 is operable to transmit the transaction data via the data interface 48 encrypted using the SSL certificate.

The graphic interface (e.g. Client Web Page) 49 comprises a plain, unencrypted HTTP page, but is configured to allow embedded SSL calls within the page to the data interface (e.g. Client Web Page interface) 48 to communicate securely with the DPM 54, accompanied by the associated SSL certificate.

Transaction Completion

The transaction with the caller is then completed by the agent 20 via a transaction handling application provided on the agent desktop 20' (for example, by an application server)

and, depending in the integration option used, middleware installed on the agent desktop 20'.

In the case of the integration option described with reference to FIG. 14(*b*), the middleware provides additional security by hiding/obscuring the sensitive information from the agent 20. The middleware in this case automatically posts the sensitive information to the transaction handling application, in obscured/hidden form to enable completion of the transaction in conjunction with other information already acquired/entered by the agent (e.g. the amount to be paid, details of the payee (where the agent acts for different possible payees), a reference number (e.g. a unique transaction/order identifier), and possibly details of the caller (e.g. personal details such as name and address, order preferences, details of an account held with the payee etc.)

In the case of the integration option described with reference to FIG. 14(*c*), the agent 20 may 'cut and paste' the sensitive information to the transaction handling application (possibly in obscured/hidden form) to enable completion of the transaction in conjunction with other information already acquired/entered by the agent (e.g. the amount to be paid, details of the payee (where the agent acts for different possible payees), a reference number (e.g. a unique transaction/order identifier), and possibly details of the caller (e.g. personal details such as name and address, order preferences, details of an account held with the payee etc.).

Accordingly, it can be seen that the call processor is advantageously configured in a modular fashion which allows integration with other security modules at each transmission and/or storage point such that it can be adapted, where necessary, for implementation in accordance with specialised security models.

Other Features and Benefits of the Call Processor
Voice Verification

In the described or other implementations, the call processor 40 may be provided with a speech recognition module and/or a voice verification module. The speech recognition module is operable to receive and interpret specific statements or words spoken by the caller 10 at specific points in the call to initiate a particular response and/or to provide an additional layer of security. The voice verification module is operable to verify the voice of the caller by comparison with stored biometric data associated with the caller. For example, a password (or passphrase) previously recorded by the caller (e.g. a mother's maiden name) could be stored securely in appropriate memory of the call processor 40 (or possibly external to it) in the form of an audio file (possibly encrypted) and/or in the form of biometric data associated with the recorded password from which verification can be made. In operation during a call, the caller 10 would state the password when requested to do so (either by the agent or by the call processor itself). The voice verification module would compare the password as spoken with the recorded version and/or the associated biometric data. Accordingly, not only is the password itself authenticated but also the way in which the password is spoken (e.g. the intonation of the speech or the like).

In these implementations, the call processor may be operable to control the voice channel during safe mode to mute the voice channel from the caller to the agent while sensitive data, such as a password, is being spoken.

Voice Feedback Generation

In the described or other implementations, the call processor 40 may be provided with a voice generation module operable to generate a voice response to the caller 10 and/or agent 20 in response to particular events (e.g. to confirm data entered and/or a successful transaction, to request repetition or re-entry of particular information in response to an error or the like), to request particular information, and/or to provide feedback of statements/words spoken by the caller for confirmation purposes. Relaying sensitive information to the caller (for example, the voice feedback module enunciating the numbers corresponding to the DTMF tones entered by the caller via the keypad to confirm correct entry) would only be done in 'secure' mode.

Two-Way Voice Interface

The voice generation, speech recognition and/or a voice verification modules may be implemented in the call processor to provide a two-way voice interface similar to that of an interactive voice response (IVR) system but maintaining a voice connection to the agent.

It will be appreciated that voice feedback and speech recognition may be used in either normal or safe mode, for example, to acquire information in normal mode which is not particularly sensitive.

Further Secure Mode

In the described or other implementations, the call processor 40 may be configured to offer a further secure mode for allowing authentication of outgoing calls made by an agent to a particular individual (e.g. a client or customer).

In this implementation, the call processor 40 is provided with an authentication module for acquiring and storing authentication information for the client/customer when the individual first registers with the entity for which the agent is acting. The authentication information may, for example, comprise a recording of the individual speaking a private piece of information or information stored in text form. The authentication module is operable to store the authentication information in association with a key (e.g. a PIN or the like) known only to the individual to whom it relates.

Before, connection of a call from the agent to the individual, the call processor 40 is operable to identify the agent (or the entity the agent is representing), by means of an ID transmitted to the call processor (e.g. using DTMF). The provision of an ID which correctly identifies an agent acting for an entity for which the recipient of the call has stored authentication information effectively triggers the further secure mode.

After connection of a call from the agent to the individual, the call processor 40 is operable to provide the individual with the opportunity to enter the key (e.g. using DTMF masked from the agent in the safe mode) and to respond to correct key entry by playing the recorded authentication information (or generating and playing synthesised speech based on information stored in text form) to the individual whilst preventing the agent from hearing it.

Accordingly, the individual receiving the call can confirm a call purportedly received from an agent is authentic.

Compatibility with Agent Systems

As described previously, in normal mode, the DTMF component of the call is allowed through to the agent system. This is particularly beneficial because during parts of the call where sensitive data is not being collected the call processor does not prevent the caller from navigating agent menu systems for example to select products of interest or to ensure that the call is put through to an agent with expertise in a particular area. The provision of the normal mode also allows compatibility with where the agent system is configured to allow a caller to enter information or navigate available options using DTMF after connection to an agent. Furthermore, allowing voice signals through whilst blocking/masking DTMF advantageously allows requests for sensitive information to be given by a human agent whilst still keeping that information secure once entered.

Control of Third Party Activity

In the described or other implementations, the call processor 40 may be provided with an interface module for allowing a caller or an agent to interact directly with a third party system, for example, by means of voice or generated tones (e.g. DTMF or special generated tones) sent directly to the third party system via the telephone lines.

The interface module may be operable for generating and transmitting instructions for controlling third party equipment. For example, the interface module may be operable to send: pause; play; stop; and/or record instructions to a voice recording platform at the call centre (e.g. to prevent inadvertent recording of sensitive information provided by a caller (by voice or DTMF).

In another exemplary application, the interface module may be operable for controlling access to a secure area. In operation according to this application, a caller calls an agent to request access to the secure area. The agent handling the call identifies the secure area to the call processor 40 which then authenticates the caller using appropriate authentication information (e.g. by means of PIN entered by the caller using DTMF) in safe mode (i.e. without the agent having access to the authentication information). On successful authentication, the call processor 40 is operable to trigger the control module to send a control signal to give the caller access to the secure area (for example, by sending an unlock instruction to a door lock).

In another exemplary application, the interface module may by operable to allow an agent to broker a transaction, or the exchange of sensitive information, between a plurality of callers (e.g. in a conference call situation). In this implementation, the call processor 40 is operable to act as an intermediary between the callers, in safe mode, to receive and/or authenticate sensitive information (e.g. payment information, authentication information, and/or security information for allowing access to sensitive information) from the callers to facilitate the transaction or exchange without the agent having access to the sensitive information.

In yet another exemplary application, the interface module may by operable to allow a caller (or agent) to interact securely with a mobile telephone network to send an SMS text message to someone.

Scaling and Resilience

The modularisation of the call processor described with reference to FIG. 3(*b*), and in particular the use of appropriate control and data interfaces, is particularly beneficial for providing a scalable and robust system. In particular, the modules described can be arranged to suit a large number of implementations and sizes. Implementations of the call processor 40 which illustrate some of these benefits are shown in FIGS. 17 and 18.

In FIG. 16, an implementation is shown which is particularly well suited to applications requiring larger scale platforms (compared, for example, to that described with reference to FIG. 3(*b*). In the implementation of FIG. 16 the telephony card 50 is located in a suitable interconnection unit 60 (for example a compact peripheral component interconnect (cPCI) chassis) at an appropriate location (e.g. a telephony centre, telephone exchange or the like) and the telephony and data processing functions 52, 54 of the call processor 40 are provided separately, as applications running on a separate server 62 (either at the same location as the interconnection unit 60 or at a location remote from it).

Control of the telephony card 50 is provided via respective control interface sections 51*a* and 51*b* on the telephony card 50 and TPM 52 and a suitable network (e.g. a local area network, Ethernet or the like).

In FIG. 17 an implementation is shown which is particularly well suited to even larger applications (compared, for example, to that described with reference to FIGS. 3(*b*) and 17). In the implementation of FIG. 17 the system comprises a plurality of telephony interconnection units 60-1, 60-2, each including its own telephony card 50-1, 50-2, and each having a respective server 62-1 and 62-2. Each server 62-1 and 62-2 includes an associated TPM 52-1, 52-2 and DPM 54-1, 54-2 for controlling the telephony card 50-1, 50-2 and handling sensitive data as generally described previously.

Each server 62-1, 62-2 is operable in a plurality of modes comprising:

(a) A first (normal) mode in which the associated TPM 52-1, 52-2 is operable for controlling the telephony card 50-1, 50-2 of its respective interconnection unit 60-1, 60-2 via corresponding control interface sections 50*a*-1 and 50*b*-1, 50*a*-2 and 50*b*-2; and (b) A second (resilience) mode in which in which the associated TPM 52-1, 52-2 is operable for controlling the telephony card 50-1, 50-2 of at least one other interconnection unit 60-2, 60-1 (e.g. via control interface sections 50*a*-1 and 50*b*-2 or 50*a*-2 and 50*b*-1) as illustrated by the dashed arrows.

It will be appreciated that each server 62-1, 62-2 may substantially simultaneously operate in the 'normal' mode for controlling the telephony card 50-1, 50-2 of its respective interconnection unit 60-1, 60-2 and the 'resilience' mode for controlling the telephony card 50-1, 50-2 of another interconnection unit 60-2, 60-1. It will be further appreciated that the telephony card 50-1, 50-2 controlled by each server 62-1, 62-2 in the normal mode may be located in the same interconnection unit 60-1, 60-2 and/or the processor modules 52-1, 52-2, 54-1, 54-2 may be located in the same server.

Accordingly, in operation, if one server 62-1, 62-2 becomes unavailable (for example, due to routine maintenance or server failure) another server 62-2, 62-1 may be used to control the telephony cards 50-1, 50-2 in the interconnection unit 60-2, 60-1 normally controlled by the unavailable server.

The provision of the processing modules 53, 54 separately from the telephony card 50, as described in the above embodiments, provides for much greater flexibility, scalability, security and resilience.

It will be appreciated that a skilled person will readily be able to arrange the modules in other advantageous configurations having other associated benefits. In these or other implementations, for example, there could be a plurality (or even a multiplicity) of telephone cards 50 (which may be arranged in one or more groups) each card 50 (or possibly each group of cards 50) having a dedicated TPM 52 and DPM 54. Furthermore, each server could include a plurality (or even a multiplicity) of TPMs 52 (which may be arranged in one or more groups) each TPM 52 (or possibly each group of TPMs 52) having a dedicated DPM 54. Moreover, the DPM(s) 54 could be provided in the same or a separate server to the TPM(s) 52, depending on requirements, for example to allow the DPM(s) 54, TPM(s) 52 and/or telephony cards 50 to be provided with different levels of security.

Referring to FIG. 18, there is shown a telephone network, generally indicated as 1002. The network 1002 comprises a plurality of user stations 1004 connected in known manner to an exchange 1006. A single exchange 1006 is shown in FIG. 8. However, depending upon the location of the users and their telephone systems, a plurality of exchanges may be involved in the overall network. The user stations 1004 may be dedicated installations for making telephone calls, conventional telephone installations connected by landlines, and/or wireless telephone instruments, such as mobile telephones.

The network 1002 comprises a plurality of switches, shown as call centres 1008, by way of example only. This embodiment will be described having reference to call centres. However, it is to be understood that the switch may be any installation receiving telephone calls from users wishing to disclose confidential transactional information.

The network further comprises a system 1010 according to the present invention and as described hereinbefore, interposed between the user stations 1004 and the call centres 1008, such that all calls from the users to the call centres are routed through the system 1010.

The system 1010 is able to communicate with a plurality of third party installations 1012, in particular to transmit transactional information data signals, as required for completion of the transaction between the user and the respective call centre.

The system 1010 comprises a digital signal processor or a plurality of digital signal processors 1014 connected by suitable interfaces 1016, 1018 and 1020 comprising telephony cards of known design with the exchange 1006, the call centres 1008 and the third party installations 1012, respectively. The system 1010 has an associated local data storage device or memory 1022, of conventional design.

In operation, the system 1010 and the network 1002 function as follows:

A user wishing to conduct a telephone transaction with a call centre 1008 in which secure transactional information is required makes a telephone call to the call centre 1008 from the user station 1004 in an entirely conventional manner. The telephone call is routed to the call centre 1008 through the system 1010, where it is first received. The processor 1014 generates a URN for the call. Alternatively, the URN is generated by an agent or operator at the call centre 1008, which is transmitted to the system 1010, for example as a DTMF signal. The call is passed out of the system 1010 to the call centre 1008 and a connection established between the user and the call centre. Typically, the call centre 1008 processes the call in the usual manner, with the call being assigned to an agent. The system 1010, in particular the processor 1014 establishes and maintains the connection between the user and the agent so as to allow verbal communication.

At a certain point during the call, the user is required to provide certain transactional information to complete the transaction. In known systems, this is either provided to the agent verbally, for example by reading out the numbers and other information on a credit card or the like, or by entering the alphanumeric information by pressing the appropriate keys on the telephone keypad, thus generating a sequence of DTMF signal tones. While the DTMF signal tones are processed by the call centre installation, they are ordinarily also audible to the agent and will be recorded as part of the audible signals in cases where the call is recorded by the call centre. In the method of the present invention, when the user is required to begin providing transactional information, the agent generates a CTI data signal that is transmitted to the system 1010, alerting the processor 1014 that DTMF data signals are to be received.

The user enters the transactional information using the keypad of the telephone device, in known manner, generating a sequence of DTMF signal tones, again in known manner. The DTMF signal is received by the processor 1014 and prevented from being transmitted directly to the call centre 1008. Rather, the DTMF signal is processed, either to remove it completely from the call data transmitted to the call centre, or sufficiently changed in format to mask the informational content. The processor 1014 generates an advisory signal each time a DTMF tone is received, which is dispatched to the call centre, advising the agent of the number of digits entered by the user. The advisory signal is a repeated single tone, unrelated to the DTMF tones actually received by the processor 1014. The processor 1014 maintains an uninterrupted connection between the user and the agent at all times during this procedure, allowing verbal communication.

The DTMF data received by the processor 1014 is combined with the URN generated to identify the call and stored in the local memory 1022. The DTMF data and associated URN may be transmitted to a third party installation 1012, such as a credit card company installation for processing of the financial information, to complete the transaction between the user and the call centre. The data package dispatched to the third party installation may also contain data, such as an authorisation, generated by the agent at the call centre and transmitted to the processor 1014. The DTMF data may be transmitted to the third party in the format as received by the processor 1014 from the user or may be converted into an alternative, secure format, for increased security. If some or all of the transactional information input by the user is required for processing by the call centre 1008 itself, the processor converts the format of the data to a format other than the DTMF format that is not audible to and/or readable or able to be readily decoded by the agent in the call centre. The thus converted data are dispatched to the call centre for internal processing without disclosure to the agent.

Overview

A system has therefore been described in which a call processor can be used either as a hosted (voice) payment gateway (or as a customer premises or customer-provided equipment (CPE) at a call centre) which allows the collection of payment card data via the telephone keypad using the DTMF protocol (or potentially by voice recognition).

The call processor has the potential to eliminate (or reduce) the collection of card details by live agents by masking the data they receive. This means both the agent and the call recording do not 'hear' the DTMF data, such that pausing the call recording equipment or encrypting the data becomes unnecessary thereby removing a significant point of compromise for stolen card details.

In one implementation, the caller maintains a voice connection with the customer throughout the interaction; there is no transferring of the call to an interactive voice response (IVR) system or other impersonal automated system. The call processor effectively 'splits' the call into voice and DTMF channels automatically such that the caller experiences little or no difference in call, other than a beneficial reduction in handling time. A safe (or secure) mode in the call processor is automatically activated when a secure transaction is required. In the safe mode the call processor effectively removes the DTMF Channel from the Call Centre Agent's experience. The configuration of the call processor allows it to be integrated directly with existing call centre (transaction handling) applications to collect and transmit secure data.

Accordingly, aside from the communication of card details, the call between customer and merchant is entirely as normal and indeed the agent and the customer remain in voice contact throughout the call. This means that customer satisfaction levels are maintained and any input errors can be quickly identified and remedied.

In summary, there is therefore provided in at least one embodiment a system for the transmission of data for a telephone transaction between a user and a switch is provided, the system comprising means for receiving a telephone communication from the user, the telephone communication comprising verbal information signals from the user and transactional information data signals comprising information required for the transaction and being for secure transmission, the transactional information data signal being in a different format to the verbal information signal and ordinarily being readable by the switch; means for establishing a telephone connection with the switch, allowing verbal communication between the user and the switch; and means for processing the telephone communication from the user such that that the transactional information data signal is withheld from direct transmission to the switch, while still maintaining the availability of verbal communication between the user and the switch. A method for transmitting data relating to a transaction to be completed over a telephone network between a user and a switch is also disclosed, the method comprising receiving a telephone communication from the user, the telephone communication comprising verbal information signals from the user and transactional information data signals comprising information required for the transaction and being for secure transmission, the transactional information data signals being in a different format to the verbal information and ordinarily being readable by the switch; establishing a telephone connection with the switch, allowing verbal communication between the user and the switch; and processing the telephone communication from the user such that that the transactional information data signal is withheld from direct transmission to the switch, while still maintaining the availability of verbal communication between the user and the switch.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

Statements in this specification of the "objects of the invention" relate to preferred embodiments of the invention, but not necessarily to all embodiments of the invention falling within the claims.

The description of the invention with reference to the drawings is by way of example only.

The text of the abstract filed herewith is repeated here as part of the specification. In an exemplary aspect of the invention of the invention there is provided a telephone call processor for processing telephone calls comprising voice signals and data signals, the call processor comprising a first telephone interface and a second telephone interface, the call processor being operable in a first mode and in a second mode. In the first mode, the call processor is adapted to receive voice signals and data signals at the first telephone interface and to transmit voice signals and data signals via the second telephone interface. In the second mode, the call processor is adapted to receive voice signals and data signals at the first telephone interface, to block data signals from being transmitted via the second telephone interface and optionally to transmit voice signals via the second telephone interface.

What is claimed is:

1. A method performed in a call processor of processing a telephone call, the method comprising:
   receiving via a first interface a telephone call, the telephone call comprising voice signals and data signals;
   generating an identifier for the telephone call; and
   while the call is in progress:
      receiving first information signals encoded in the data signals via a first interface and second information signals via a second interface;
      associating the identifier with the first and second information signals;
      generating a request based on the first and second information signals;
      transmitting via a data interface the request to an external entity;
      receiving via the data interface a message from the entity to identify success or failure of the request;
      matching the received message to the telephone call in dependence on the identifier; and
      processing the first and second information signals in dependence on the success or failure of the request.

2. The method according to claim 1, the method further comprising:
   transmitting via the second interface at least some of the voice signals and the data signals with at least some of the data signals modified to prevent all of the transaction information signals being transmitted via the second interface.

3. The method according to claim 2, further comprising modifying at least some of the data signals by masking or replacing them with other signals.

4. The method according to claim 3, wherein the data signals comprise audible tones.

5. The method according to claim 4, wherein the audible tones include dual-tone multi-frequency (DTMF) tones.

6. The method according to claim 2, further comprising transmitting at least some of the voice signals via the second interface at the same time as receiving at least some of the data signals via the first interface.

7. The method according to claim 6, further comprising transmitting via the first interface voice signals received via the second interface at the same time as receiving at least some of the data signals via the first interface.

8. The method according to claim 1, further comprising receiving data signals as part of the telephone call, the data signals being operable to navigate a menu system.

9. The method according to claim 1, further comprising blocking the first transaction information signals received via the first interface from being transmitted via the second interface.

10. The method according to claim 1, wherein the telephone call comprises a transaction or the collection of sensitive information.

11. The method according to claim 10, wherein the sensitive information comprises at least one of: personal information, financial information, or associated information to enable identification of the user.

12. The method according to claim 11, wherein the personal information comprises at least one of: address data including a postal code or a zip code, a date of birth, a national insurance number, or social security number.

13. The method according to claim 11, wherein the financial information comprises at least one of: a credit card number, a charge card number, a bank account numbers, or a sort code.

14. The method according to claim 11, wherein the associated information includes at least one of: a password, or an answer to a security question.

15. An apparatus for processing a telephone call, the apparatus comprising a telephone call processor adapted to receive via a first interface a telephone call comprising voice signals and data signals, the telephone call processor being further adapted:
   to generate an identifier for the telephone call; and
   while the call is in progress:
      to receive first information signals encoded in the data signals via a first interface and second information signals via a second interface;
      to associate the identifier with the first and second information signals;
      to generate a request based on the first and second information signals;
      to transmit via a data interface the request to an external entity;
      to receive via the data interface a message from the entity to identify success or failure of the request;
      to match the received message to the telephone call in dependence on the identifier; and
      to process the first and second information signals in dependence on the success or failure of the request.

16. The apparatus according to claim 15, further adapted to transmit via the second interface at least some of the voice signals and the data signals and to modify at least some of the data signals to prevent all of the transaction information signals being transmitted via the second interface.

17. The apparatus according to claim 16, further adapted to modify at least some of the data signals by masking or replacing them by other signals.

18. The apparatus according to claim 17, wherein the data signals comprise audible tones.

19. The apparatus according to claim 18, wherein the audible tones include dual-tone multi-frequency (DTMF) tones.

20. The apparatus according to claim 16, further adapted to transmit at least some of the voice signals via the second interface at the same time as receiving at least some of the data signals via the first interface.

21. The apparatus according to claim 20, further adapted to transmit via the first interface voice signals received via the second interface at the same time as receiving at least some of the data signals via the first interface.

22. The apparatus according to claim 15, further adapted to receive data signals as part of the telephone call, the data signals being operable to navigate a menu system.

23. The apparatus according to claim 15, further adapted to block the first transaction information signals received via the first interface from being transmitted via the second interface.

24. An apparatus for processing a telephone call placed to a call centre, the apparatus comprising a telephone call processor located external to the call centre and adapted to receive via a first interface a telephone call comprising voice signals and data signals, the telephone call processor being further adapted:
   to generate an identifier for the telephone call;
   to receive information signals encoded in the data signals;
   to associate the identifier with the information signals;
   to generate a request based on the information signals;
   to transmit via a data interface the request to an external entity;
   to receive via the data interface a message from the entity to identify success or failure of the request;
   to match the received message to the telephone call in dependence on the identifier; and
   to process the information signals in dependence on the success or failure of the request.

25. The apparatus according to claim 24, wherein the telephone call comprises a transaction or the collection of sensitive information.

26. The apparatus according to claim 25, wherein the sensitive information comprises at least one of: personal information, financial information, or associated information to enable identification of the user.

27. The apparatus according to claim 26, wherein the personal information comprises at least one of: address data including a postal code or a zip code, a date of birth, a national insurance number, or social security number.

28. The apparatus according to claim 26, wherein the financial information comprises at least one of: a credit card number, a charge card number, a bank account numbers, or a sort code.

29. The apparatus according to claim 26, wherein the associated information includes at least one of: a password, or an answer to a security question.

* * * * *